US011431681B2

(12) United States Patent
Kittur et al.

(10) Patent No.: US 11,431,681 B2
(45) Date of Patent: Aug. 30, 2022

(54) APPLICATION AWARE TCP PERFORMANCE TUNING ON HARDWARE ACCELERATED TCP PROXY SERVICES

(71) Applicant: Pensando Systems Inc., Milpitas, CA (US)

(72) Inventors: Sameer Kittur, Fremont, CA (US); Raghava Kodigenahalli Sivaramu, Fremont, CA (US); Alok Rathore, Milpitas, CA (US); Vijay Sampath, Milpitas, CA (US); Vipin Jain, San Jose, CA (US)

(73) Assignee: PENSANDO SYSTEMS INC., Milpitas, CA (US)

( * ) Notice: Subject to any disclaimer, the term of this patent is extended or adjusted under 35 U.S.C. 154(b) by 47 days.

(21) Appl. No.: 16/842,537

(22) Filed: Apr. 7, 2020

(65) Prior Publication Data

US 2021/0314303 A1    Oct. 7, 2021

(51) Int. Cl.
*H04L 29/06* (2006.01)
*H04L 9/40* (2022.01)
*G06F 13/28* (2006.01)
*H04L 9/32* (2006.01)

(52) U.S. Cl.
CPC .......... *H04L 63/0281* (2013.01); *G06F 13/28* (2013.01); *H04L 9/3263* (2013.01); *H04L 63/0428* (2013.01); *H04L 63/20* (2013.01)

(58) Field of Classification Search
CPC . H04L 63/0281; H04L 63/0428; H04L 63/20; H04L 9/3263; G06F 13/28
See application file for complete search history.

(56) References Cited

U.S. PATENT DOCUMENTS

| 7,688,968 | B1 | | 3/2010 | Chen et al. |
| 8,370,622 | B1 | | 2/2013 | Dattatreya et al. |
| 8,813,225 | B1 | * | 8/2014 | Fuller ..................... H04L 67/16 |
| | | | | 726/23 |
| 10,104,039 | B1 | * | 10/2018 | Knecht ............... H04L 61/2592 |
| 2002/0112057 | A1 | * | 8/2002 | Srinivas ............... H04L 1/1832 |
| | | | | 709/228 |

(Continued)

FOREIGN PATENT DOCUMENTS

| EP | 2522109 A1 | 11/2012 |
| WO | WO-0233896 A2 | 4/2002 |

(Continued)

OTHER PUBLICATIONS

Co-pending U.S. Appl. No. 16/415,609, filed May 17, 2019.

(Continued)

*Primary Examiner* — Vance M Little
(74) *Attorney, Agent, or Firm* — Wilson Sonsini Goodrich & Rosati

(57) ABSTRACT

Described are platforms, systems, and methods for actuating transmission control protocol/Internet protocol (TCP/IP) through a method comprises: identifying a computer workload during a handshake process for establishing a network connection with a remote host; configuring, based on the computer workload, one or more TCP/IP parameters of the network connection; and completing the handshake process to establish the network connection with the remote host.

17 Claims, 10 Drawing Sheets

(56) References Cited

U.S. PATENT DOCUMENTS

| | | |
|---|---|---|
| 2003/0174649 A1* | 9/2003 | Shankar .............. H04L 12/2898 |
| | | 370/235 |
| 2004/0071085 A1 | 4/2004 | Shaham et al. |
| 2006/0050640 A1 | 3/2006 | Jin et al. |
| 2006/0153179 A1 | 7/2006 | Ho et al. |
| 2008/0037420 A1 | 2/2008 | Tang |
| 2008/0084900 A1 | 4/2008 | Dunn |
| 2008/0181112 A1 | 7/2008 | Beck et al. |
| 2008/0304412 A1 | 12/2008 | Schine et al. |
| 2010/0011118 A1 | 1/2010 | Chang et al. |
| 2010/0031042 A1* | 2/2010 | Di Crescenzo ....... H04L 9/3273 |
| | | 713/169 |
| 2013/0195123 A1 | 8/2013 | Stern et al. |
| 2013/0204965 A1 | 8/2013 | Masputra et al. |
| 2013/0279338 A1 | 10/2013 | Mehrotra et al. |
| 2013/0322247 A1 | 12/2013 | Li et al. |
| 2014/0003242 A1 | 1/2014 | Nadas et al. |
| 2014/0164641 A1* | 6/2014 | Ye ........................... H04L 47/11 |
| | | 709/235 |
| 2014/0177455 A1 | 6/2014 | Astigarraga et al. |
| 2014/0348182 A1 | 11/2014 | Chandra et al. |
| 2015/0236909 A1* | 8/2015 | Valluri ...................... H04L 1/20 |
| | | 370/229 |
| 2015/0341273 A1 | 11/2015 | Naouri et al. |
| 2016/0036909 A1 | 2/2016 | Joshi |
| 2016/0212098 A1* | 7/2016 | Roch ................... H04L 63/0428 |
| 2016/0234099 A1* | 8/2016 | Jiao ......................... H04L 45/02 |
| 2016/0374094 A1 | 12/2016 | Bakshe et al. |
| 2017/0019803 A1 | 1/2017 | Nguyen et al. |
| 2017/0078205 A1 | 3/2017 | Stalling et al. |
| 2017/0163633 A1* | 6/2017 | Yang ..................... H04L 63/166 |
| 2018/0212885 A1 | 7/2018 | Contavalli et al. |
| 2018/0302328 A1 | 10/2018 | Keith et al. |
| 2019/0012156 A1 | 1/2019 | Daly et al. |
| 2019/0327323 A1 | 10/2019 | Daly et al. |
| 2019/0386913 A1 | 12/2019 | Wei |
| 2020/0076736 A1 | 3/2020 | Tilli |
| 2020/0336426 A1 | 10/2020 | Tadimeti et al. |
| 2020/0382426 A1 | 12/2020 | Li et al. |
| 2021/0194829 A1 | 6/2021 | Sun et al. |
| 2022/0070097 A1 | 3/2022 | Pan et al. |

FOREIGN PATENT DOCUMENTS

| | | |
|---|---|---|
| WO | WO-2019046603 A1 | 3/2019 |
| WO | WO-2019133434 A1 | 7/2019 |
| WO | WO-2019164827 A1 | 8/2019 |
| WO | WO-2019209181 A1 | 10/2019 |
| WO | WO-2020236599 A1 | 11/2020 |
| WO | WO-2021041622 A1 | 3/2021 |
| WO | WO-2021155282 A1 | 8/2021 |
| WO | WO-2021207231 A1 | 10/2021 |

OTHER PUBLICATIONS

Co-pending U.S. Appl. No. 16/553,947, filed Aug. 28, 2019.
Co-pending U.S. Appl. No. 16/779,096, filed Jan. 31, 2020.
Co-pending U.S. Appl. No. 16/860,650, filed Apr. 28, 2020.
Co-pending U.S. Appl. No. 17/000,172, filed Aug. 21, 2020.
PCT/US2020/033154 International Search Report and Written Opinion dated Aug. 26, 2020.
PCT/US2021/026001 International Search Report and Written Opinion dated Jun. 30, 2021.
U.S. Appl. No. 16/415,609 Office Action dated May 5, 2021.
U.S. Appl. No. 16/643,311 Office Action dated Sep. 24, 2021.
PCT/US2018/048893 International Search Report and Written Opinion dated Jan. 3, 2019.
Liu et al. Offloading distributed applications onto smartnics using ipipe. Proceedings of the ACM Special Interest Group on Data Communication pp. 318-333 (2019).
PCT/US2020/048127 International Search Report and Written Opinion dated Jan. 21, 2021.
PCT/US2020/048127 Invitation to Pay Additional Fees dated Nov. 4, 2020.
PCT/US2020/048127 Invitation to Pay Additional Fees dated Oct. 4, 2020.
PCT/US2021/015896 International Search Report and Written Opinion dated Apr. 14, 2021.
U.S. Appl. No. 16/553,947 Office Action dated Dec. 1, 2020.
U.S. Appl. No. 16/553,947 Office Action dated Jan. 27, 2021.

* cited by examiner

APPLICATION AWARE TCP PERFORMANCE TUNING ON HARDWARE ACCELERATED TCP PROXY SERVICES

BACKGROUND

Network traffic refers to the amount of data moving across a network at a given point of time. Network data is mostly encapsulated in network packets, which provide the load in the network. Network traffic is the main component for network traffic measurement, network traffic control, and simulation. The proper organization of network traffic helps in ensuring the quality of service in a given network.

SUMMARY

Computing environments may include hosts such as servers, computers running one or more processes, such as virtual machines or containers. The hosts and/or processes may be configured to communicate with other processes or devices over a computing network. The host systems interface with the computing network via input/output (IO) devices (e.g., network interface cards (NICs)).

Computer systems interface to IO devices through a specified set of device registers and memory-based data structures. These registers and data structures are usually fixed for a given IO device, allowing a specific device driver program to run on the computer system and control the IO device. In a data communication network, network interfaces are normally fixedly defined control structures, descriptors, registers and the like. Networking data and control structures are memory based and access memory using direct memory access (DMA) semantics. Network systems such as switches, routing devices, receive messages or packets at one of a set of input interfaces and forward them on to one or more of a set of output interfaces. Users typically require that such routing devices operate as quickly as possible in order to keep pace with a high rate of incoming messages. One challenge associated with network systems relates to providing flexible network interfaces so as to adapt to changes in the network device structure and feature set, various protocols, operating systems, applications, and the rapid development of device models.

Communications service providers are investing heavily in large and hyper-scale data centers to deliver content, data processing, and communications services. The applications delivering these services must have access to high-speed storage and networking, be secure, and run in a virtualized environment based on software-defined networking (SDN). Virtualization software, load balancing, encryption, deep packet inspection (DPI), and packet processing all require many central processing unit (CPU) cycles and can tie up multiple processor cores, reducing the number of cores available for applications.

A NIC is a Peripheral Component Interconnect Express (PCIe) expansion card that plugs into a server or storage box to enable connectivity to an Ethernet network. Traditional NICs support offload of CPU functions, such as checksum and segmentation. However, with the recent tectonic shift in cloud data center networking driven by SDN and network functions virtualization (NFV), a new class of offload NIC is needed. More specifically, the complexity of the server-based networking data plane has increased dramatically with the introduction of overlay tunneling protocols, such as virtual extensible local-area network (VXLAN), and virtual switching with complex actions. Additionally, increasing network interface bandwidths mean that performing these functions in software creates an untenable load on the CPU resources, leaving little or no CPU left over to run applications. Moreover, a key requirement of SDN is that the networking data plane must remain fungible, so fixed-function offload technologies cannot be applied.

A smartNIC (also known as an intelligent server adapter (ISA)) goes beyond simple connectivity and implements network traffic processing on the NIC that would necessarily be performed by the CPU in the case of a foundational NIC. SmartNICs can be employed in cloud data center servers to boost performance by offloading operations of the CPUs of the servers by performing network datapath processing through an IO subsystem. For example, the IO subsystem provided through a SmartNIC offloads low-level operations from server CPUs to dramatically increasing network and application performance. By installing smartNICs, communications service providers can deliver significantly better revenue-earning services with a small increase in investment.

A typical proxy service deployment redirects data packets to a proxy appliance. This type of deployment increases latency and wastes network bandwidth. For example, a typically a Transmission Control Protocol (TCP) Proxy/Transport Layer Security (TLS) termination-based solution that is available primarily as an appliance. Most of these solutions requires traffic redirection. Moreover, many NIC vendors provide offload for TCP segmentation, or Crypto operation offload. However, these require changes/support from the host stack. The described solution is transparent to host.

Moreover, encryption everywhere has evolved to be an integral part of network security. But, for any organization that continues to support legacy application, adding network encryption is a challenge. For example, adding network encryption support to an existing application typically involves rewriting parts of it to include a secure transport such as TLS. Also, modifying legacy applications may not always be possible due to various factors like the time-to-market/software development cycles/maintenance overheads. Additionally, deploying encryption everywhere has a cost even for newer applications where a considerable amount of CPU cycles are spent on asymmetric and symmetric cryptography, which is needed for key negotiation and secure transport. Also, a security key management lifecycle becomes a responsibility of the individual application owners that incur any extra operations overhead.

Described herein are transparent proxy systems that are deployed as inline-services on host servers via an IO subsystem (e.g., a smartNIC, ISA). The described system provides a unique mechanism of implementing TCP/TLS termination in hardware while retaining the programmability using P4-based Application Specific Integrated Circuits (ASICs). The describe systems can be applied in-line with hardware acceleration and incur no datapath penalties on the host in terms of latency or bandwidth. Moreover, the P4-based programmable nature (see below) of this mechanism makes it highly flexible and extensible while still providing the performance of existing hardware-based offloads. In some embodiments, the described system offloads the entire TLS datapath into hardware, as compared to individual crypto operations.

A typical TCP congestion control mechanism reacts only to network triggers (e.g., network drops, ECN, and so forth) to adjust TCP window. The described system employs an IO subsystem to combine the application identity with the network triggers for dynamic performance tuning, while providing the hardware acceleration with a P4 programmable TCP stack. The programmability and upgrade-ability of the TCP software enables upgrading of the protocol stack to support new TCP features/enhancements, such as congestion-control algorithms, configurable options, newer Request for Comments (RFCs), in addition to bug-fixes, all without requiring upgrades the host and/or application software. Furthermore, typically TCP parameters need to be modified either using OS system settings or using socket options. The described system provides dynamic discovery of application identity/requirements where TCP parameters can be dynamically tuned based on application requirements and do not require these configurations.

In some embodiments, the described transparent proxy system includes a wire-speed TLS/Datagram TLS (DTLS) proxy service that is transparent to host applications. In some embodiments, the described system does not rely on any host software for TLS Handshake or session establishment including the Public-key Cryptography. In some embodiments, the described, the TLS Handshake or session establishment is performed via hardware accelerations within an IO subsystem.

In some embodiments, the performance of the IO device may be improved by replacing the conventional fixed function direct memory access (DMA) engine, control registers and device state machines with a programmable pipeline of match, action and DMA stages. For example, a stage in the pipeline may initiate DMA read and write operations to the host system, fetching memory-based descriptors, scatter gather lists (SGL), or custom data structure which describe IO operations. The provided interface mechanism may comprise describing host computer data structures using a stack of fields which map to the data structures (e.g., descriptor is used to describe how a packet is made, different types of packets); storing internal DMA engine state in programmable match tables which can be updated by the hardware pipeline (e.g., match processing unit (MPU)) as well as by the host processor; describing device registers by a separate of programmable field definitions and backed by hardware mechanisms through address remapping mechanisms. The above interface mechanism enables the IO device to directly interact with host data structures without the assistance of the host system thus allowing lower latency and deeper processing in the IO device.

In some embodiments, interface provided by the employed IO device interface includes a highly optimized ring-based IO queue interface. Such a ring-based IO queue interface may include an efficient software programming model to deliver high performance with, for example, CPU and PCIe bus efficiency. In some embodiments, the programmable IO device is communicably coupled to a processor of a host computer system via a PCIe bus. In some embodiments, the IO device interfaces to a host system via one or more (e.g., one to eight) physical PCIe interfaces.

Advantages of the described transparent proxy system include: reducing CPU cycles in the host TCP stack as the Host-TCP-leg will not receive much of packet-drops/slow-path processing of the TCP layer, which is typically the heavy-hitters for CPU consumption, thereby improving the performance of the Host kernel/applications. Also, since the Host-TCP-leg is t between the Host's TCP stack and the TCP stack on the IO subsystem over the PCIe, the Round-trip delay time (RTT) of this connection is very small and thus any packet-drops will have much quicker convergence hence better throughput performance. The described system reduces latency and increases response time latency on the host leg.

Accordingly, in one aspect, disclosed herein is a programmable input output IO device that includes at least one advanced reduced instruction set computer (RISC) machine (ARM) core communicably coupled to at least one CPU core of a host device, and a memory unit. The memory unit having instructions stored thereon which, when executed by the programmable IO device, cause the programmable IO device to perform operations actuating transmission control protocol/Internet protocol (TCP/IP). The operations comprising: identifying a computer workload during a handshake process for establishing a network connection with a remote host; configuring, based on the computer workload, one or more TCP/IP parameters of the network connection; and completing the handshake process to establish the network connection with the remote host. In some embodiments, the computer workload is a software application, a container application, or a computing process, provided through the host device. In some embodiments, the operations comprise: identifying a cryptographic identity of the computer workload. In some embodiments, the cryptographic identity of the computer workload is related to an associated security group. In some embodiments, the one or more TCP/IP parameters are configured based on the cryptographic identity of the computer workload. In some embodiments, the handshake process comprises sending a certificate including the cryptographic identity of the computer workload. In some embodiments, the operations comprise: preforming a deep packet inspection on a data packet received by the programmable IO device. In some embodiments, the cryptographic identity of the computer workload is identified based on the deep packet inspection. In some embodiments, the one or more TCP/IP parameters are configured based a network policy associated with the cryptographic identity of the computer workload. In some embodiments, the network policy comprises a type of the computer workload, a priority of the computer workload, or a port associated with the computer workload, an IP address associated with the computer workload, or a protocol associated with the computer workload. In some embodiments, the operations comprise: identifying, during the handshake process, a plurality of computer workloads and a cryptographic identity of each of the computer workloads. In some embodiments, the one or more TCP/IP parameters are configured based the cryptographic identities of the computer workloads. In some embodiments, the one or more TCP/IP parameters are configured based on a queue depth of a queue associated with the computer workload, and wherein the queue depth is determined according to a difference between the queue and a consumer index. In some embodiments, the one or more TCP/IP parameters are associated with a congestion control algorithm, a retransmission method, a sequence number, a TCP flag checking method, a transmission-window size, a congestion window assize, or a send/receive buffer size. In some embodiments, the one or more TCP/IP parameters are related to L4-L7 protocols. In some embodiments, the operations comprise: enabling or disabling a security protocol to be applied to a data flow associated with the computer workload. In some embodiments, the security protocol is enabled or disabled based on a request or a location of the computer workload. In some embodiments, the operations comprise: terminating the data flow; and determining one or more TCP algorithms based on the data flow. In some embodiments, the operations comprise: upgrading a TCP algorithm without intervention from the host device.

In a related yet separate aspect, a method for actuating TCP/IP is provided. In some embodiments, the method is executed by a programmable IO device installed in a host device. The method comprising: identifying a computer workload during a handshake process for establishing a network connection with a remote host; configuring, based on the computer workload, one or more TCP/IP parameters of the network connection; and completing the handshake process to establish the network connection with the remote host. In some embodiments, the computer workload is a software application, a container application, or a computing process, provided through the host device. In some embodiments, the operations comprise: identifying a cryptographic identity of the computer workload. In some embodiments, the cryptographic identity of the computer workload is related to an associated security group. In some embodiments, the one or more TCP/IP parameters are configured based on the cryptographic identity of the computer workload. In some embodiments, the handshake process comprises sending a certificate including the cryptographic identity of the computer workload. In some embodiments, the operations comprise: preforming a deep packet inspection on a data packet received by the programmable IO device. In some embodiments, the cryptographic identity of the computer workload is identified based on the deep packet inspection. In some embodiments, the one or more TCP/IP parameters are configured based a network policy associated with the cryptographic identity of the computer workload. In some embodiments, the network policy comprises a type of the computer workload, a priority of the computer workload, or a port associated with the computer workload, an IP address associated with the computer workload, or a protocol associated with the computer workload. In some embodiments, the operations comprise: identifying, during the handshake process, a plurality of computer workloads and a cryptographic identity of each of the computer workloads. In some embodiments, the one or more TCP/IP parameters are configured based the cryptographic identities of the computer workloads. In some embodiments, the one or more TCP/IP parameters are configured based on a queue depth of a queue associated with the computer workload, and wherein the queue depth is determined according to a difference between the queue and a consumer index. In some embodiments, the one or more TCP/IP parameters are associated with a congestion control algorithm, a retransmission method, a sequence number, a TCP flag checking method, a transmission-window size, a congestion window assize, or a send/receive buffer size. In some embodiments, the one or more TCP/IP parameters are related to L4-L7 protocols. In some embodiments, the operations comprise: enabling or disabling a security protocol to be applied to a data flow associated with the computer workload. In some embodiments, the security protocol is enabled or disabled based on a request or a location of the computer workload. In some embodiments, the operations comprise: terminating the data flow; and determining one or more TCP algorithms based on the data flow. In some embodiments, the operations comprise: upgrading a TCP algorithm without intervention from the host device.

In a related yet separate aspect, a transparent proxy system is provided. The transparent proxy system comprising: a remote host; a host device comprising: at least one CPU core; and a programmable IO device. The programmable IO device comprising: at least one ARM core communicably coupled to the at least one CPU core. The programmable IO device configured to execute instructions that cause the programmable IO device to perform operations actuating TCP/IP. The operation comprising: identifying a computer workload during a handshake process for establishing a network connection with a remote host; configuring, based on the computer workload, one or more TCP/IP parameters of the network connection; and completing the handshake process to establish the network connection with the remote host. In some embodiments, the computer workload is a software application, a container application, or a computing process, provided through the host device. In some embodiments, the operations comprise: identifying a cryptographic identity of the computer workload. In some embodiments, the cryptographic identity of the computer workload is related to an associated security group. In some embodiments, the one or more TCP/IP parameters are configured based on the cryptographic identity of the computer workload. In some embodiments, the handshake process comprises sending a certificate including the cryptographic identity of the computer workload. In some embodiments, the operations comprise: preforming a deep packet inspection on a data packet received by the programmable IO device. In some embodiments, the cryptographic identity of the computer workload is identified based on the deep packet inspection. In some embodiments, the one or more TCP/IP parameters are configured based a network policy associated with the cryptographic identity of the computer workload. In some embodiments, the network policy comprises a type of the computer workload, a priority of the computer workload, or a port associated with the computer workload, an IP address associated with the computer workload, or a protocol associated with the computer workload. In some embodiments, the operations comprise: identifying, during the handshake process, a plurality of computer workloads and a cryptographic identity of each of the computer workloads. In some embodiments, the one or more TCP/IP parameters are configured based the cryptographic identities of the computer workloads. In some embodiments, the one or more TCP/IP parameters are configured based on a queue depth of a queue associated with the computer workload, and wherein the queue depth is determined according to a difference between the queue and a consumer index. In some embodiments, the one or more TCP/IP parameters are associated with a congestion control algorithm, a retransmission method, a sequence number, a TCP flag checking method, a transmission-window size, a congestion window assize, or a send/receive buffer size. In some embodiments, the one or more TCP/IP parameters are related to L4-L7 protocols. In some embodiments, the operations comprise: enabling or disabling a security protocol to be applied to a data flow associated with the computer workload. In some embodiments, the security protocol is enabled or disabled based on a request or a location of the computer workload. In some embodiments, the operations comprise: terminating the data flow; and determining one or more TCP algorithms based on the data flow. In some embodiments, the operations comprise: upgrading a TCP algorithm without intervention from the host device.

It shall be understood that different aspects of the described system can be appreciated individually, collectively, or in combination with each other. Various aspects of the systems described herein may be applied to any of the particular applications set forth below or for any other types of the data processing system disclosed herein. Any description herein concerning the data processing may apply to and be used for any other data processing situations. Additionally, any embodiments disclosed in the context of the data processing system or apparatuses are also applicable to the methods disclosed herein.

BRIEF DESCRIPTION OF THE DRAWINGS

A better understanding of the features and advantages of the present subject matter will be obtained by reference to the following detailed description that sets forth illustrative embodiments and the accompanying drawings of which.

DETAILED DESCRIPTION

Figure 1:
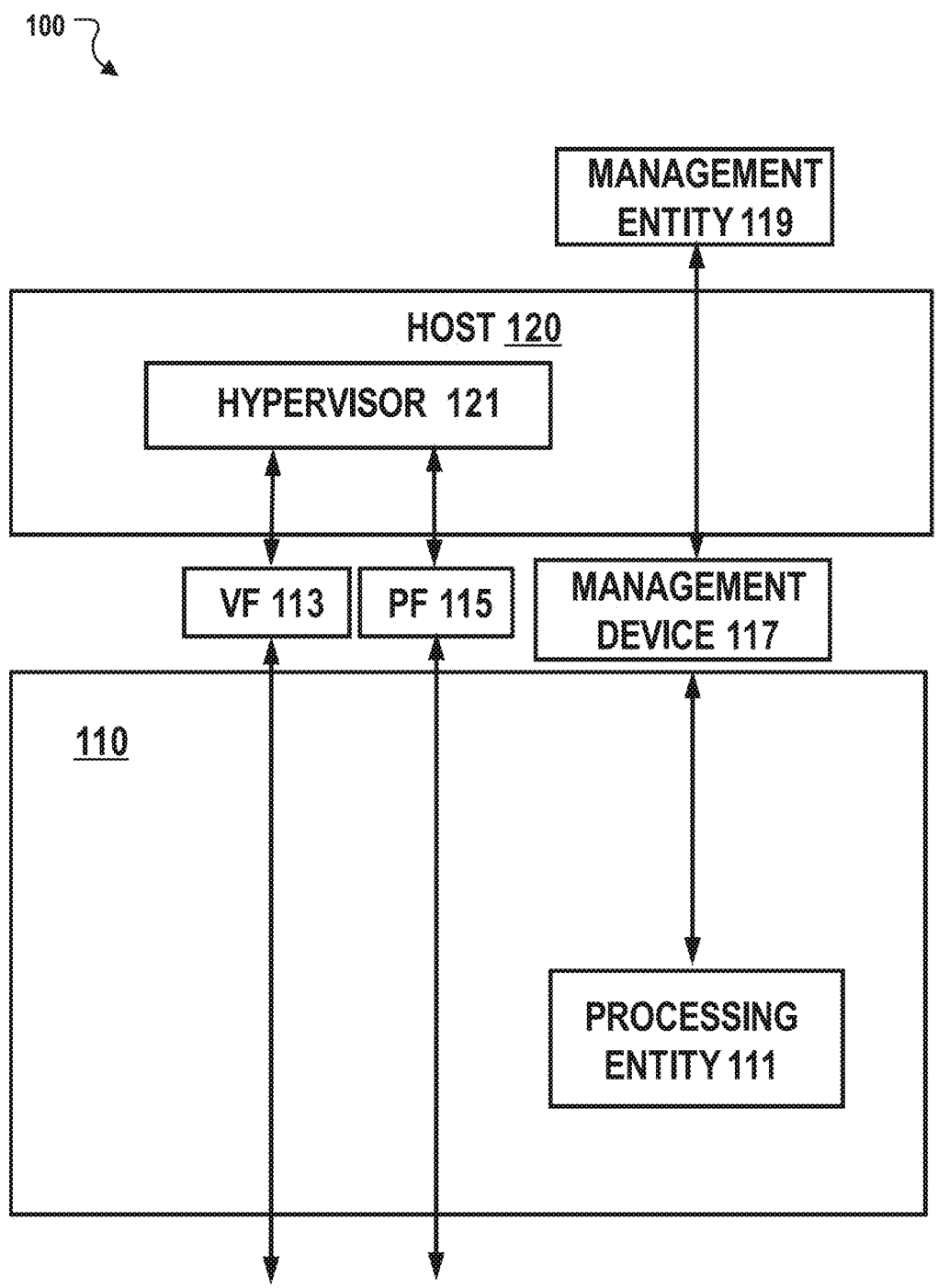
FIG. 1 depicts a non-limiting example a computing system architecture that may be employed by embodiments of the present disclosure.

Described herein, in certain embodiments, are programmable IO devices comprising at least one ARM core communicably coupled to at least one CPU core of a host device; and a memory unit. The memory unit having instructions stored thereon which, when executed by the programmable IO device, cause the programmable IO device to perform operations actuating TCP/IP. The operations comprising: identifying a computer workload during a handshake process for establishing a network connection with a remote host; configuring, based on the computer workload, one or more TCP/IP parameters of the network connection; and completing the handshake process to establish the network connection with the remote host.

Also described herein, in certain embodiments, are methods for actuating TCP/IP. In some embodiments, the methods are executed by a programmable IO device installed in a host device. The methods comprising: identifying a computer workload during a handshake process for establishing a network connection with a remote host; configuring, based on the computer workload, one or more TCP/IP parameters of the network connection; and completing the handshake process to establish the network connection with the remote host.

Also described herein, in certain embodiments, are transparent proxy systems comprising: a remote host; a host device comprising: at least one CPU core; and a programmable IO device. The programmable IO device comprising: at least one ARM core communicably coupled to the at least one CPU core. The programmable IO device configured to execute instructions that cause the programmable IO device to perform operations actuating TCP/IP. The operation comprising: identifying a computer workload during a handshake process for establishing a network connection with a remote host; configuring, based on the computer workload, one or more TCP/IP parameters of the network connection; and completing the handshake process to establish the network connection with the remote host.

Certain Definitions

Unless otherwise defined, all technical terms used herein have the same meaning as commonly understood by one of ordinary skill in the art to which this described system belongs.

As used herein, the singular forms "a," "an," and "the" include plural references unless the context clearly dictates otherwise. Any reference to "or" herein is intended to encompass "and/or" unless otherwise stated.

Reference throughout this specification to "some embodiments," or "an embodiment," means that a particular feature, structure, or characteristic described in connection with the embodiment is included in at least one embodiment. Thus, the appearances of the phrase "in some embodiment," or "in an embodiment," in various places throughout this specification are not necessarily all referring to the same embodiment. Furthermore, the particular features, structures, or characteristics may be combined in any suitable manner in one or more embodiments.

As referenced herein, terms "component," "system," "interface," "unit," "block," "device" and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Moreover, the word "exemplary" where used herein to means serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the term "real-time" refers to transmitting or processing data without intentional delay given the processing limitations of a system, the time required to accurately obtain data and images, and the rate of change of the data and images. In some examples, "real-time" is used to describe the presentation of information obtained from components of embodiments of the present disclosure.

As used herein, PCIe includes a high-speed serial computer expansion bus standard. In some examples, PCIe is a motherboard interface for hardware components, such as, graphics cards, hard drives, solid-state drives (SSDs), Wi-Fi and Ethernet hardware connections. PCIe is based on point-to-point topology, with separate serial links connecting every device to the root complex (host). PCIe has improvements over the older standards (e.g., Peripheral Component Interconnect (PCI), PCI eXtended (PCI-X) and Accelerated Graphics Port (AGP) bus standards), including higher maximum system bus throughput, lower IO pin count and smaller physical footprint, better performance scaling for bus devices, a more detailed error detection and reporting mechanism (e.g., Advanced Error Reporting, (AER)), and native hot-swap functionality. More recent revisions of the PCIe standard provide hardware support for IO virtualization.

As used herein, an expansion card includes a printed circuit board that can be inserted into an electrical connector, or expansion slot, on a computer motherboard, backplane or riser card to add functionality to a computer system via an expansion bus. In some embodiments, an expansion bus is a computer bus that moves information between the internal hardware of a computer system, such as the CPU and random access memory (RAM), and peripheral devices such as cache, other memory, data storage or electronic display adapters.

As used herein, operations include compression, decompression, encryption, decryption, hash digest computation (dedupe), checksum, and so forth. In some embodiments, these operations also perform "generic" work, such as fetch, decode and execute.

As used herein, a chain of operations includes a combination or a sequence of operations. For example, compress plus encrypt, decrypt plus decompress, checksum plus encrypt plus checksum, and hash plus compress plus pad plus hash.

As used herein, a datapath includes a collection of functional units, such as arithmetic logic units or multipliers, which perform data processing operations, registers, and buses. A larger datapath can be made by joining more than one number of datapaths using multiplexer. In some embodiments, offload chaining within a datapath provides for increased processing throughput. For example, a smartNIC may have a 100 Gigabits per second (Gbps) PCIe datapath which, if not properly employed by, for example, a host operating system, would not achieve the full 100 Gbps throughput. The counterpart of a datapath is the control path, which may execute on a host CPU and, as such, would not be able to reach the 100 Gbps throughput.

Embodiments of the described system may be used in a variety of applications. Some embodiments of the described system may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, a wireless communication station, a wireless communication device, a wireless access point (AP), a modem, a network, a wireless network, a local area network (LAN), a wireless LAN (WLAN), a metropolitan area network (MAN), a wireless MAN (WMAN), a wide area network (WAN), a wireless WAN (WWAN), a personal area network (PAN), a wireless PAN (WPAN), devices and/or networks operating in accordance with existing IEEE 802.11, 802.11a, 802.11b, 802.11e, 802.11g, 802.11h, 802.11i, 802.11n, 802.16, 802.16d, 802.16e standards and/or future versions and/or derivatives and/or long term evolution (LTE) of the above standards, units and/or devices which are part of the above networks, one way and/or two-way radio communication systems, cellular radio-telephone communication systems, a cellular telephone, a wireless telephone, a personal communication systems (PCS) device, a PDA device which incorporates a wireless communication device, a multiple input multiple output (MIMO) transceiver or device, a single input multiple output (SIMO) transceiver or device, a multiple input single output (MISO) transceiver or device, or the like.

The term "table" refers to a variety types of tables involved in data or packet processing. For example, the table may be match tables used in the match+action stages, such as forwarding tables (e.g., hash tables for Ethernet address lookup, the longest-prefix match tables for IPv4 or IPv6, wildcard lookups for Access Control Lists (ACLs)). These tables may be stored in various memory locations such as in internal static random access memory (SRAM), NIC DRAM, or host memory.

The term "match+action" refers to the paradigm for network packet switching (such as those performed by an OpenFlow switch or P4 pipeline, which uses match tables, action tables, statistics memories, meters memories, stateful memories, and ternary indirection memories). The term "P4" refers to a high-level language for programming protocol-independent packet processors. P4 is a declarative language for expressing how packets are processed by the pipeline of a network forwarding element such as a switch, NIC, router or network function appliance. It is based upon an abstract forwarding model consisting of a parser and a set of match+action table resources, divided between ingress and egress. The parser identifies the headers present in each incoming packet. Each match+action table performs a lookup on a subset of header fields and applies the actions corresponding to the first match within each table.

The term "stateful configuration state" refers to the entries in the memory that correspond to the two-legs of the bi-directional flow and entries that are not updated on a per-packet basis and are instead created with the first flow-miss packet.

While portions of this disclosure, for demonstrative purposes, refer to wired and/or wired communication systems or methods, embodiments of the described system are not limited in this regard. As an example, one or more wired communication systems, can utilize one or more wireless communication components, one or more wireless communication methods or protocols, or the like.

TCP Proxy Solution

In some embodiments, the described transparent proxy system enables a transparent TCP TLS proxy. In some embodiments, the described transparent proxy system employs an IO subsystem (e.g., via a distributed service card such as a smartNIC or ISA) to provide a TCP TLS proxy as close to the host as possible. In some embodiments, the described transparent proxy system can be employed to provide for a secure upgrade. The described solution allows a network administrator or a network security owner of an enterprise to transparently provide upgrading services, which may include adding security to existing applications and upgrading software on an IO subsystem (e.g., a distributed services card). As an example, TLS traffic may be received by the host via a distributed service card that terminates the traffic, decrypts, and sends the plain text back to the host.

In some embodiments, the described transparent proxy system pushes the encryption transparently into a programmable IO subsystem (e.g., a smartNIC or ISA). In some embodiments, by terminating plain TCP from or towards the host, the IO subsystem is able to secure the connection via a transparent proxy. The transparent proxy seamlessly secures the transport, both for legacy applications and new applications thus providing the benefit of lower CPU consumption on the servers which in turn could help scale the applications. In some embodiments, employing the programmable IO subsystem also shifts the security operations into a single pane for the organization's network as a whole via a central controller. This enables consistent policies related to key management and key rotation/rekeying to be deployed across the organization.

In some embodiments, employing the programmable IO subsystem enables security vulnerabilities to be addressed at the network infrastructure level across the entire organization. The programmable solution also supports new and more secure key exchange and authentication algorithms (e.g., as long as they are supported in the hardware), in effect upgrading the security of the network without having to change any of the applications themselves.

In some embodiments, the described system is in-line (e.g., executed on a distributed service card) and transparent to the host. In some embodiments, the described system provides a leg of traffic with TCP connections that go all the way to the network element (e.g., the distributed service card?) providing the transferring proxy service. The solution provides for decreased traffic in the network and can be done without having to disrupt host applications.

In some embodiments, the described transparent proxy system implements a TCP stack on the data-plane processors using extended P4 programmable language, which makes TCP extensible and performant. In addition, the programmable IO subsystem may implement a TLS record processor on the data-plane processor that uses the capabilities of a cryptographic offload subsystem (e.g., a cryptographic hardware block) to achieve a high rate of TLS record processing. In some embodiments, the described transparent proxy system employs this performant TCP stack along with the TLS record processing and encryption/decryption in the data-plane processor.

In some embodiments, on a new incoming TCP connection, a flow engine identifies the new TCP flow and requests a control-plane processor to handle the TCP flow. For example, policies on the control-plane processor may determine that the flow needs to be subjected to transparent proxy service with specific configured security parameters. The control-plane processor may then attempt to establish the second leg of the TCP proxy connection to the peer. Once the TCP connection has been established successfully, the connection state is offloaded to the data-plane processors which then take over all further processing of the TCP session. In some embodiments, subsequently TLS negotiations are initiated using the configured certificates and ciphers that are part of the policy. A policy may be centrally administered for each workload via a controller. For example, match criterion includes the 5-tuple. Once the TLS authentication is complete and the session keys have been negotiated, the TLS state can be transferred to the data-plane processor and the session is completely offloaded. In some embodiments, the TLS record processor in the data-plane processors examines the records and traps non-data records that need further processing, such as handling alerts in case of errors or handshake messages to initiate or respond to and complete renegotiation process. The policy on the control-plane processor may determine the lifespan of session keys and trigger renegotiation when the session keys are about to expire. For a more detailed explanation of an embodiment of this process, see the description below referencing FIG. 6A.

Performance Tuning

In some embodiments, an application identity can be discovered automatically during connection establishment. This information can be used to influence TCP protocol behavior and performance (e.g., congestion window or algorithm, send/receive buffer sizing) on the fly without breaking/impacting existing sessions. Additionally, since the TCP Proxy solution can transparently terminate a Host-connection (Host-TCP-leg) and re-originates a TCP connection to the remote TCP endpoint (Network-TCP-leg), the TCP Proxy absorbs the bulk of the TCP stack processing, such as, the handling of retransmissions; out-of-order-queueing, congestion-control. Moreover, with the reduced probability of packet-drops on the Host-TCP-leg, the established TCP proxy minimizes the TCP stack processing overheads in the Host TCP stack (e.g., the kernel or userspace) to a great extent and results in significant savings of CPU cycles on the host.

In some embodiments, the described transparent proxy system provides application discovery and performance tuning. For application discovery, in some embodiments, the identity/security group of the remote and local application is exchanged inside the certificate as a part of TLS handshake. In some embodiments, the identity is associated to Security Groups and which can be used to resolve network policies. In some embodiments, packet inspection using applications like snort can be used to resolve application identity/requirements. Additionally, users can provide application identity as a policy using specific TCP ports. In some embodiments, APIs are provided through the IO subsystem to external controllers to 1) provision policies on a per-flow basis, and 2) configure and control the parameters/services applicable to a given flow or sets of flows that can be identified by the typical n-tuple of {src-ip, src-tcp-port, dest-ip, dest-tcp-port, . . . }

For performance tuning, during connection setup as set up 'advertised window' is employed based on resolved policies for the flow (e.g., set higher advertised window for higher priority flows or which need higher rate of data transfer). In some embodiments, the described transparent proxy system has visibility to higher layer application queues (e.g., TLS) and can adjust the TCP advertised window. In some embodiments, on an established session, the advertised window can be modified based on higher level application queue utilization (e.g., TLS queues). In some embodiments, the queue depth can be analyzed in real-time by calculating the difference b/w the TLS queue producer and consumer-index.

In some embodiments, the P4 program employed for TCP congestion control/protocol is picked on a per-flow basis. Thus, it can pick different protocol/congestion control algorithm for different applications. In some embodiments, a TLS module (see FIG. 5A) can be enabled/disabled on a per-flow basis dynamically based on application requirements or application location (e.g., workload placement/vmotion). In some embodiments, the IO subsystem software can be upgraded independently of the host software, thereby bringing in support for newer features/enhancements, such as congestion-control algorithms, support for newer TCP RFCs, and so forth, without requiring host software upgrades.

IO Subsystem

Although some portions of the discussion herein may relate, for demonstrative purposes, to a fast or high-speed interconnect infrastructure, to a fast or high-speed interconnect component or adapter with OS bypass capabilities, to a fast or high-speed interconnect card or NIC with OS bypass capabilities, or to a to a fast or high-speed interconnect infrastructure or fabric, embodiments of the described system are not limited in this regard, and may be used in conjunction with other infrastructures, fabrics, components, adapters, host channel adapters, cards or NICs, which may or may not necessarily be fast or high-speed or with OS bypass capabilities. For example, some embodiments of the described system may be utilized in conjunction with Infini-Band (TB) infrastructures, fabrics, components, adapters, host channel adapters, cards or NICs; with Ethernet infrastructures, fabrics, components, adapters, host channel adapters, cards or NICs; with gigabit Ethernet (GEth) infrastructures, fabrics, components, adapters, host channel adapters, cards or NICs; with infrastructures, fabrics, components, adapters, host channel adapters, cards or NICs that have OS with infrastructures, fabrics, components, adapters, host channel adapters, cards or NICs that allow a user mode application to directly access such hardware and bypassing a call to the operating system (namely, with OS bypass capabilities); with infrastructures, fabrics, components, adapters, host channel adapters, cards or NICs; with infrastructures, fabrics, components, adapters, host channel adapters, cards or NICs that are connectionless and/or stateless; and/or other suitable hardware.

Computer systems employ a wide variety of peripheral components or IO devices. An example of a host processor of a computer system connected to IO devices through a component bus defined by PCIe, a high-speed serial computer expansion bus standard. Device drivers (also referred to drivers) are hardware-specific software which controls the operation of hardware devices connected to computing systems.

In computing, virtualization techniques are used to allow multiple operating systems to simultaneously share processor resources. One such virtualization technique is Single Root IO Virtualization (SR-IOV), which is described in the PCI-SIG Single Root IO Virtualization and Sharing Specifications. A physical IO device may allow multiple virtual machines to use the device concurrently through SR-IOV. In SR-IOV, a physical device may have physical functions (PFs) that allow for input/output operations and device configuration, as well as one or more virtual functions (VFs) that allow for data input/output. According to SR-IOV, a Peripheral Component Interconnect Express (PCIe) device can appear to be multiple separate physical PCIe devices. For example, a SR-IOV NIC having a single port can have up to 256 virtual functions, with each virtual function representing a respective NIC port.

In one aspect, a programmable device interface is provided. The device interface may be a highly optimized ring based IO queue interface with an efficient software programming model to deliver high performance with CPU and PCIe bus efficiency. FIG. 1 shows a block diagram of an exemplary computing system architecture 100, in accordance with embodiments of the described system. A hypervisor 121 on the host computing system 120 may interact with the physical IO device 110 using the PFs 115 and one or more VFs 113. As illustrated, the computing system 120 may comprise a management device 117 configured for management of the interface devices. The management device 117 may be in communication with a processing entity 111 (e.g., ARM cores) and a management entity 119 (e.g., management virtual machine system). It should be noted that the illustrated computing system is only an example mechanism, without suggesting any limitation as to the scope of the described system. The provided programmable IO interface and methods can be applied to any operating-system-level virtualization (e.g., container and docker system) or machine level virtualization or computing system without virtualization features.

The hypervisor 121 generally provides operating system functionality (e.g., process creation and control, file system process threads, etc.) as well as CPU scheduling and memory management for the host. In some cases, the host computing system 120 may include programs that implement a machine emulator and virtualizer. The machine emulator and virtualizer may assist in virtualizing respective computer IO devices in virtual machines, such as virtualized hard disks, compact disk drives, and NICs. Virtio is a virtualization standard for implementing virtual IO devices in a virtual machine and may be considered as an abstraction for a set of common emulated devices in a hypervisor.

The provided programmable IO device interface mechanism allows for native hardware speeds when using the device emulator. The programmable IO device interface allows the host system to interface with the IO device with existing device drivers without reconfiguration or modification. In some cases, the VF device, PF device and management device may have similar driver interface such that such devices can be supported by a single driver. Such devices may, in some cases, be referred to as Ethernet devices.

The IO device 110 may provide a variety of services and/or functionality to an operating system operating as a host on computing system 120. For example, the IO device may provide network connectivity functions to the computing system, coprocessor functionality (e.g., graphics processing, encryption/decryption, database processing, etc.) and the like. The IO device 110 may interface with other components in the computing system 100 via, for example, a PCIe bus.

As mentioned above, SR-IOV specification enables a single root function (for example, a single Ethernet port) to appear to virtual machines as multiple physical devices. A physical IO device with SR-IOV capabilities may be configured to appear in the PCI configuration space as multiple functions. The SR-IOV specification supports physical functions and virtual functions.

Physical functions are full PCIe devices that may be discovered, managed, and configured as normal PCI devices. Physical functions configured and manage the SR-IOV functionality by assigning virtual functions. The IO device may expose one or more physical functions (PFs) 115 to a host computing system 120 or hypervisor 121. The PFs 115 may be full-featured PCIe devices that include all configuration resources and capabilities for the IO device. In some cases, the PFs may be PCIe functions that include SR-IOV extended capability, which facilitates the configuration or management of the IO device. The PF device is essentially a base controller of the Ethernet device. The PF device may be configured with up to 256 VFs. In some cases, the PFs may include extended operations such as allocating, configuring and freeing a VF, discovering hardware capabilities of the VF, such as Receive Side Scaling (RSS), discovering hardware resources of the VF, such as number of queues and interrupts resources, configuring the hardware resources and features of a VF, saving and restoring hardware state and the like. In some instances, the PF device may be configured as a boot device which may present an Option ROM base address registers (BAR).

The IO device may also provide one or more virtual functions (VFs) 113. The VFs may be lightweight PCIe functions that contain the resources necessary for data movement but may have a minimized set of configuration resources. In some cases, the VFs may include lightweight PCIe functions that support SR-IOV. To use SR-IOV devices in a virtualized system, the hardware may be configured to create multiple VFs. These VFs may be made available to the hypervisor for allocations to virtual machines. The VFs may be manipulated (e.g., created, configured, monitored, or destroyed) for example, by the SR-IOV physical function device. In some cases, each of the multiple VFs is configured with one or more base address registers (BARs) to map NIC resources to the host system. A VF may map one or more LIFs or port, which are used in the IO device for forwarding and transaction identification. A LIF may belong to only one VF. Within a physical device, all virtual functions may have an identical BAR resource layout, stacked sequentially in host PCIe address space. The IO device PCIe interface logic may be programmed to map control registers and NIC memory regions with programmable access permissions (e.g., read, write, execute) to the VF BARs.

The IO device 110 may comprise a management device 117 for management of the IO device. The management device 117 may not have direct access to the network uplink ports. The management device may be in communication with the processing entity 111. For example, the traffic on the management device may be steered to internal receive queues for processing by the management software on the processing entity 111. In some cases, the management device may be made available to pass through the hypervisor to a management entity 119 such as a management virtual machine. For example, the management device 117 may be assigned a device ID different from the PF device 115, such that a device driver in the hypervisor may be released for the PF device when the PF device does not claim the management device.

Figure 2:
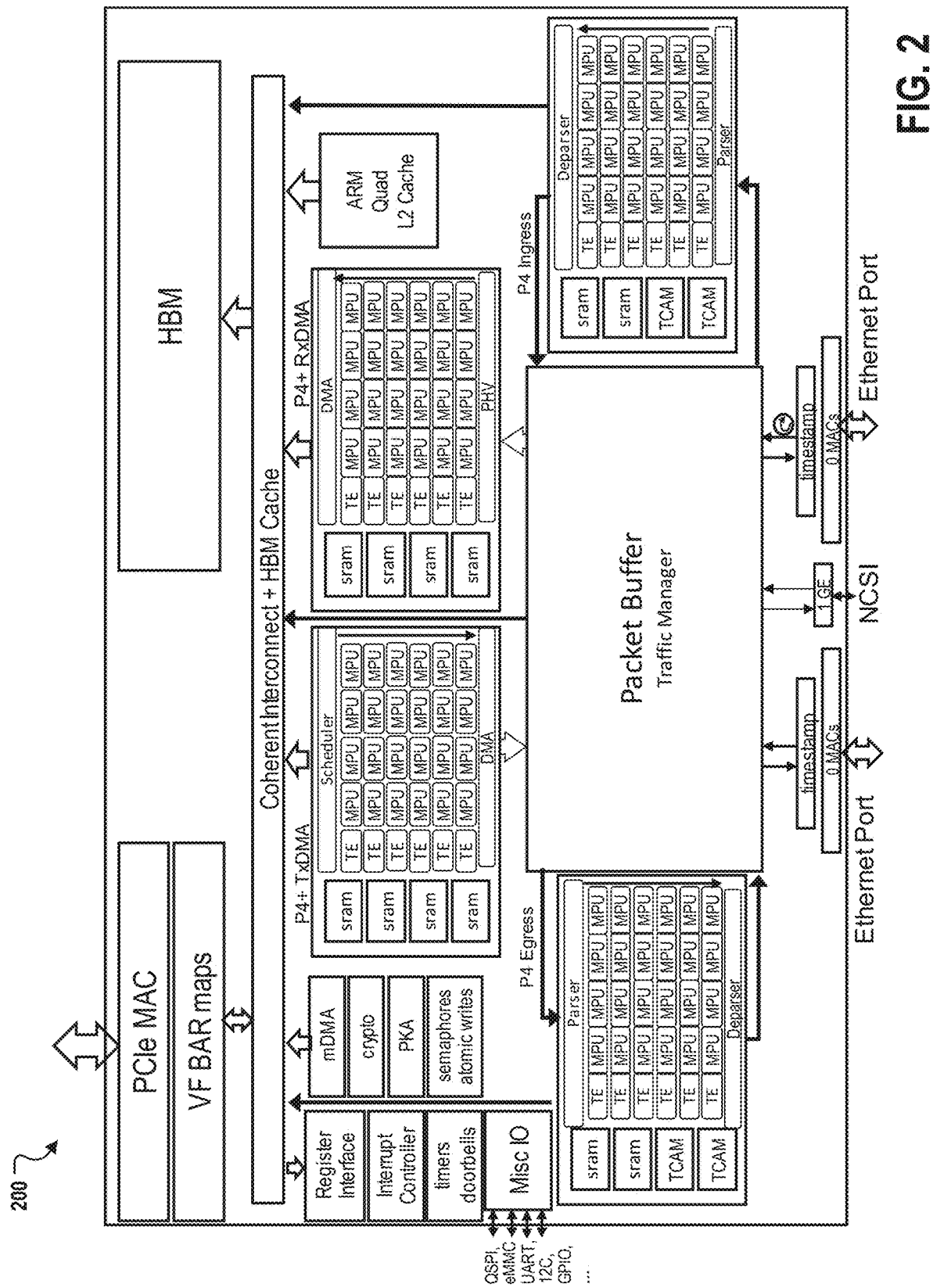
FIG. 2 depicts a non-limiting example of configurations of multiples MPUs for executing a program that may be employed by embodiments of the present disclosure.

FIG. 2 shows another exemplary IO device system 200 with described programmable device interface, in accordance with some embodiments of the described system. The system 200 serves as an example of implementing the P4 and extended P4 pipelines and various other functions to provide an improved network performance. In some cases, the device interface may have improved network performance by: not requiring PCIe bus register reads in the packet transmit or receive path; providing a single posted (non-blocking) PCIe bus register write for packet transmit; supporting for message signaled interrupts (MSI) and message signaled interrupts-extended (MSI-X) modes with driver-configurable interrupt moderation for high-performance interrupt processing; supporting IO queues with outstanding requests (e.g., up to 64k) per queue; transmitting TCP segmentation Offload (TSO) with improved send size; providing TCP/User Datagram Protocol (UDP) checksum offload; supporting for a variable number of Receive Queues to support industry standard Receive Side Scaling (RSS); supporting SR-IOV with up to 255 virtual functions.

The IO device system 200 may be the same IO device as described in FIG. 1 and implemented as a rack mounted device and comprise one or more ASICs and/or boards with components mounted thereon. As shown in FIG. 2, the system 200 may comprise four ARM processors with coherent L1 and L2 caches, a shared local memory system, flash non-volatile memory, DMA engines, and miscellaneous IO devices for operation and debug. The ARM processors may observe and control all NIC resources via an address map. The ARM processor may implement the P4 pipeline and the extended P4 pipeline as described later herein.

The system may comprise a host interface and a network interface. The host interface may be configured to provide communication link(s) with one or more hosts (e.g., host servers). The host interface block may also observe regions of the address space via PCIe BAR maps to expose NIC functions to a host system. In an example, the address map may be initially created according to the principles of ARM memory maps, ARM limited, which provides SOC addressing guidelines for a 34-bit memory map.

The network interface may support network connections or uplinks with a computing network that may be, for example, a local area network, wide area network and various others as described elsewhere herein. The physical link may be controlled by a management agent (e.g., management entity 119) through the device driver. For example, the physical link may be configured via a "virtual link" associated with a device LIF.

Memory transactions in the system 200, including host memory, high bandwidth memory (HBM), and registers may be connected via a coherent network on a chip (NOC) based on IP from an external Systems. The NOC may provide cache coherent interconnect between the NOC masters, including P4 pipeline, extended P4 pipeline, DMA, PCIe, and ARM. The interconnect may distribute HBM memory transactions across a plurality (e.g., 16) of HBM interfaces using a programmable hash algorithm. All traffic targeting HBM may be stored in the NOC cache (e.g., 1 MB cache). The NOC cache may be kept coherent with the ARM caches. The NOC cache may be used to aggregate HBM write transactions which may be smaller than the cache line (e.g., size of 64 bytes), as the HBM is not efficient when processing small writes. The NOC cache may have high bandwidth, supporting up to 3.2 Tb/s operation as it fronts the 1.6 Tb/s HBM.

The system may comprise an internal HBM memory system for running Linux, storing large data structures such as flow tables and other analytics, and providing buffering resources for advanced features including TCP termination and proxy, deep packet inspection, storage offloads, and connected FPGA functions. The memory system may comprise an HBM module which may support 4 GB capacity or 8 GB capacity, depending on package and HBM.

As mentioned above, the system may comprise a PCIe host interface. The PCIe host interface may support a bandwidth of, for example, 100 Gb/s per PCIe connection (e.g., dual PCIe Gen4x8 or single PCIe Gen3x16). A mechanism or a scheme to map resources available at the IO device to memory-mapped control regions associated with the virtual IO devices may be implemented by using a pool of configurable PCIe Base Address Registers (BARs) coupled with a resource mapping table to store mapping information for each virtual IO device. The IO resources provided by the IO device may be mapped to host addresses in the framework of the PCIe standard such that the same device drivers that are utilized to communicate with physical PCIe devices may be utilized to communicate with corresponding virtual PCIe devices.

The IO device interface may comprise programmable registers. These registers may comprise, for example, PCIe base address registers (BARs) that may include a first memory BAR containing device resources (e.g., device command registers, doorbell registers, interrupt control registers, interrupt status registers, MSI-X interrupt table, MSI-X interrupt pending bit array, etc.) a second BAR containing device doorbells pages, and a third BAR for mapping a controller memory buffer.

The device command registers are a set of registers used for submitting administrative commands to the hardware or firmware. For example, the device command registers may specify a single-64 byte command and a single 16-byte completion response. This register interface may allow for a single command outstanding at a time. The device command doorbell is a special purpose doorbell used to signal a command is ready in the device command registers.

The second BAR may contain doorbells pages. The general form of the second BAR may contain multiple LIFs with multiple doorbell pages per LIF. A network device (i.e., IO device) may have at least one LIF with at least one doorbell page. Any combination of single/many LIFs with single/many Doorbell Pages is possible and the driver may be prepared to identify and operate the different combinations. In an example, doorbell pages may be presented on a 4k stride by default to match a common system page size. The stride between doorbell pages may be adjusted in the virtual function device 113 to match the system page size configuration setting in the SR-IOV capability header in the parent physical function device 115. This page size separation allows protected independent direct access to a set of doorbell registers by processes by allowing each process to map and access a doorbell page dedicated for its use. Each page may provide the doorbell resources needed to operate the datapath queue resources for a LIF, while protecting access to those resources from another process.

The doorbell register may be written by software to adjust a queue's producer index. Adjusting the producer index is the mechanism to transfer ownership of queue entries in the queue descriptor ring to the hardware. Some doorbell types, such as the Admin Queue, Ethernet Transmit Queue, and RDMA Send Queue, may cause the hardware queue to schedule further processing of the descriptors available in the queue. Other queue types, such as Completion Queues and Receive Queues, may require no further action from the hardware queue after updating the producer index.

The interrupt status register may contain a bit for each interrupt resource of the device. The register may have a bit set indicating the corresponding interrupt resource has asserted its interrupt. For example, bit 0 in Interrupt Status indicates interrupt resource 0 is asserted, bit 1 indicates interrupt resource 1 is asserted.

The controller memory buffer may be a region of general-purpose memory resident on the IO device. The user or kernel driver may map in this controller memory BAR, and build descriptor rings, descriptors, and/or payload data in the region. A bit may be added in the descriptor to select whether the descriptor address field is interpreted as a host memory address, or as an offset relative to the beginning of the device controller memory window. The extended P4 program may set a designated bit (e.g., bit 63) of the address if it is a host address or clear the bit and add the device controller memory base address to the offset when building the TxDMA operations for the DMA stage.

The MSI-X resources may be mapped through the first BAR and the format may be described by the PCIe Base Specification. The MSI-X interrupt table is a region of control registers that allows an OS to program MSI-X interrupt vectors on behalf of the driver.

The MSI-X Interrupt Pending Bit Array (PBA) is an array of bits, one for each MSI-X interrupt supported by the device.

The IO device interface may support programmable DMA register tables, descriptor formats, and control register formats, allowing specialized VF interfaces and user defined behaviors. The IO device PCIe interface logic may be programmed to map control registers and NIC memory regions with programmable access permissions (e.g., read, write, execute) to the VF BARs.

Match Processing Unit

In an aspect of the described system, an MPU is provided to process a data structure. The data structure may comprise various types such as data packet, a management token, administrative command from a host, a processing token, a descriptor ring and various others. The MPU may be configured to perform various operations according to the type of data being processed or different purposes. For example, the operations may include table-based actions for processing packets, table maintenance operations such as writing a timestamp to a table or harvesting table data for export, administrative operations such as creating new queues or memory maps, gathering statistics, and various other operations such as initiating a bulk data processing that may result in writing any type of modified data to the host memory.

In some embodiments, the MPU may process a data structure in order to update the memory-based data structure or initiate an event. The event may or may not relate to modifying or updating a packet. For instance, the event may be administrative operations such as creating new queues or memory maps, gathering statistics, initiating a bulk data processing that may result in writing any type of modified data to the host memory, or performing calculations on descriptor rings, scatter gather lists (SGLs).

Figure 3:
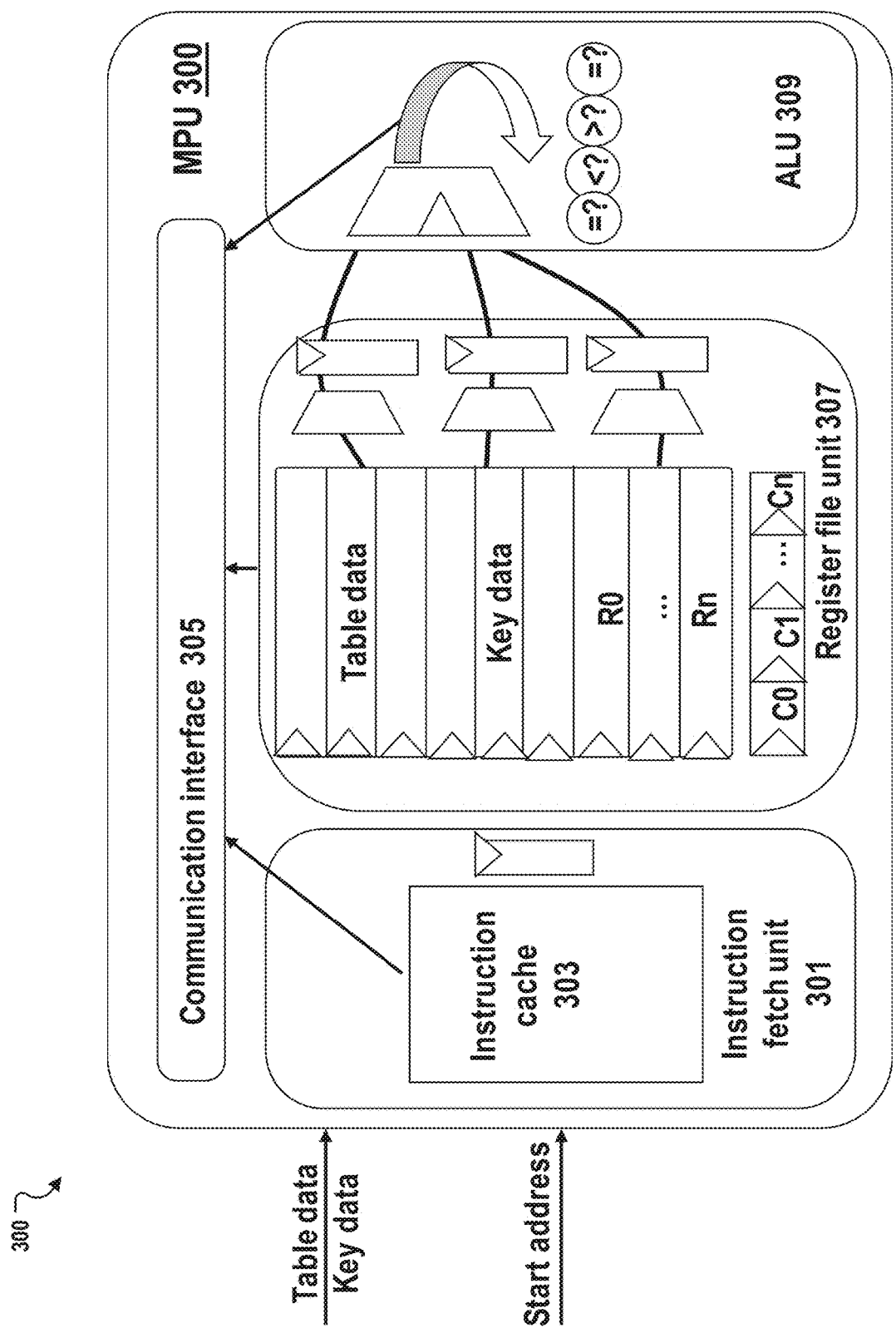
FIG. 3 depicts a non-limiting example of an MPU that may be employed by embodiments of the present disclosure.

FIG. 3 shows a block diagram of an MPU 300, in accordance with embodiments of the described system. In some embodiments, the MPU unit 300 may comprise multiple functional units, memories and at least a register file. For example, the MPU unit may comprise an instruction fetch unit 301, a register file unit 307, a communication interface 305, arithmetic logic units (ALUs) 309 and various other functional units.

In the illustrated example, the MPU unit 300 may comprise a write port or communication interface 305 allowing for memory read/write operations. For instance, the communication interface may support packets written to or read from an external memory (e.g., high bandwidth memory (HBM) of a host device) or an internal static random access memory (SRAM). The communication interface 305 may employ any suitable protocol such as Advanced Microcontroller Bus Architecture (AMBA) Advanced extensible Interface (AXI) protocol. AXI is a bus protocol for a high-speed/high-end on-chip bus protocol and has channels associated with read, write, address, and write response, which are respectively separated, individually operated, and have transaction properties such as multiple-outstanding address or write data interleaving. The AXI interface 305 may include features that support for unaligned data transfers using byte strobes, burst based transactions with only start address issued, separate address/control and data phases, issuing of multiple outstanding addresses with out of order responses, and easy addition of register stages to provide timing closure. For example, when the MPU executes a table write instruction, the MPU may track which bytes have been written to (a.k.a. dirty bytes) and which remain unchanged. When the table entry is flushed back to the memory, the dirty byte vector may be provided to AXI as a write strobe, allowing multiple writes to safely update a single table data structure as long they do not write to the same byte. In some cases, dirty bytes in the table need not be contiguous and the MPU may only write back a table if at least one bit in the dirty vector is set. Though packet data is transferred according the AXI protocol in the packet data communication on-chip interconnect system according to the present exemplary embodiment in the present specification, it can also be applied to a packet data communication on-chip interconnect system operating by other protocols supporting a lock operation, such as Advanced High-performance Bus (AHB) protocol or Advanced Peripheral Bus (APB) protocol in addition to the AXI protocol.

The MPU 300 may comprise an instruction fetch unit 301 configured to fetch instruction set from a memory external to the MPU based on the input table result or at least a portion of the table result. The instruction fetch unit may support branches and/or linear code paths based on table results or a portion of a table result provided by a table engine. In some cases, the table result may comprise table data, key data and/or a start address of a set of instructions/program. Details about the table engine are described later herein. In some embodiments, the instruction fetch unit 301 may comprise an instruction cache 303 for storing one or more programs. In some cases, the one or more programs may be loaded into the instruction cache 303 upon receiving the start address of the program provided by the table engine. In some cases, a set of instructions or a program may be stored in a contiguous region of a memory unit, and the contiguous region can be identified by the address. In some cases, the one or more programs may be fetched and loaded from an external memory via the communication interface 305. This provides flexibility to allow for executing different programs associated with different types of data using the same processing unit. In an example, when a management packet header vector (PHV) injected into the pipeline, for example to perform administrative table direct memory access (DMA) operations or entry aging functions (i.e., adding timestamps), one of the management MPU programs may be loaded to the instruction cache to execute the management function. The instruction cache 303 can be implemented using various types of memories such as one or more SRAMs.

The one or more programs can be any programs such as P4 programs related to reading table, building headers, DMA to/from memory regions in HBM or in the host device and various other actions. The one or more programs can be executed in any stage of a pipeline as described elsewhere herein.

The MPU 300 may comprise a register file unit 307 to stage data between the memory and the functional units of the MPU, or between the memory external to the MPU and the functional units of the MPU. The functional units may include, for example, ALUs, meters, counters, adders, shifters, edge detectors, zero detectors, condition code registers, status registers, and the like. In some cases, the register file unit 307 may comprise a plurality of general-purpose registers (e.g., R0, R1, . . . Rn) which may be initially loaded with metadata values then later used to store temporary variables within execution of a program until completion of the program. For example, the register file unit 307 may be used to store SRAM addresses, ternary content addressable memory (TCAM) search values, ALU operands, comparison sources, or action results. The register file unit of a stage may also provide data/program context to the register file of the subsequent stage, as well as making data/program context available to the next stage's execution datapath (i.e., the source registers of the next stage's adder, shifter, and the like). In one embodiment, each register of the register file is 64 bits and may be initially loaded with special metadata values such as hash value from table, lookup, packet size, PHV timestamp, programmable table constant and the like, respectively.

In some embodiments, the register file unit 307 may also comprise comparator flags unit (e.g., C0, C1, Cn) configured to store comparator flags. The comparator flags can be set by calculation results generated by the ALU which in return is compared with constant values in an encoded instruction to determine a conditional branch instruction. In an embodiment, the MPU may comprise eight one-bit comparator flags. However, it should be noted that MPU may comprise any number of comparator flag units each of which may have any suitable length.

The MPU 300 may comprise one or more functional units such as the ALU 309. The ALU may support arithmetic and logical operations on the values stored in the register file unit 307. The results of the ALU operations (e.g., add, subtract, AND, OR, XOR, NOT, AND NOT, shift, and compare) may then be written back to the register file. The functional units of the MPU may, for example, update or modify fields anywhere in a PHV, write to memory (e.g., table flush), or perform operations that are not related to PHV update. For example, the ALU may be configured to perform calculations on descriptor rings, scatter gather lists (SGLs), and control data structures loaded into the general-purpose registers from the host memory.

The MPU 300 may comprise various other functional units such as meters, counters, action insert unit and the like. For example, the ALU may be configured to support P4 compliant meters. A meter is a type of action executable on a table match used to measure data flow rates. A meter may include a number of bands, typically two or three, each of which has a defined maximum data rate and optional burst size. Using a leaky bucket analogy, a meter band is a bucket filled by the packet data rate and drained at a constant allowed data rate. Overflow occurs if the integration of data rate exceeding quota is larger than the burst size. Overflowing one band triggers activity into the next band, which presumably allows a higher data rate. In some cases, a field of the packet may be remarked as a result of overflowing the base band. This information might be used later to direct the packet to a different queue, where it may be more subject to delay or dropping in case of congestion. The counter may be implemented by the MPU instructions. The MPU may comprise one or more types of counters for different purposes. For example, the MPU may comprise performance counters to count MPU stalls. The action insert unit may be configured to push the register file result back to the PHV for header field modifications.

The MPU may be capable of locking a table. In some case, a table being processed by an MPU may be locked or marked as "locked" in the table engine. For example, while an MPU has a table loaded into its register file, the table address may be reported back to the table engine, causing future reads to the same table address to stall until the MPU has released the table lock. For instance, the MPU may release the lock when an explicit table flush instruction is executed, the MPU program ends, or the MPU address is changed. In some cases, an MPU may lock more than one table addresses, for example, one for the previous table write-back and another address lock for the current MPU program.

MPU Pipelining

A single MPU may be configured to execute instructions of a program until completion of the program. Alternatively, or additionally, multiple MPUs may be configured to execute a program. In some embodiments, a table result may be distributed to multiple MPUs. The table result may be distributed to multiple MPUs according to an MPU distribution mask configured for the tables. This provides advantages to prevent data stalls or mega packets per second (MPPS) decrease when a program is too long. For example, if a PHV requires four table reads in one stage, then each MPU program may be limited to only eight instructions in order to maintain a 100 MPPS if operating at a frequency of 800 MHz in which scenario multiple MPUs may be desirable.

Any number of MPUs may be used for executing a program in order to meet a desirable performance. For instance, at least two, three, four, five, six, seven, eight, nine, or ten MPUs may be used to execute a program. Each MPU may execute at least a portion of the program or a subset of the instruction set. The multiple MPUs may perform the execution simultaneously or sequentially. Each MPU may or may not perform the same number of instructions. The configurations may be determined according to the length of program (i.e., number of instructions, cycles) and/or number of available MPUs. In some case, the configuration may be determined by an application instruction received from a main memory of a host device operably coupled to the plurality of MPUs.

P4 Pipelines

Figure 4:
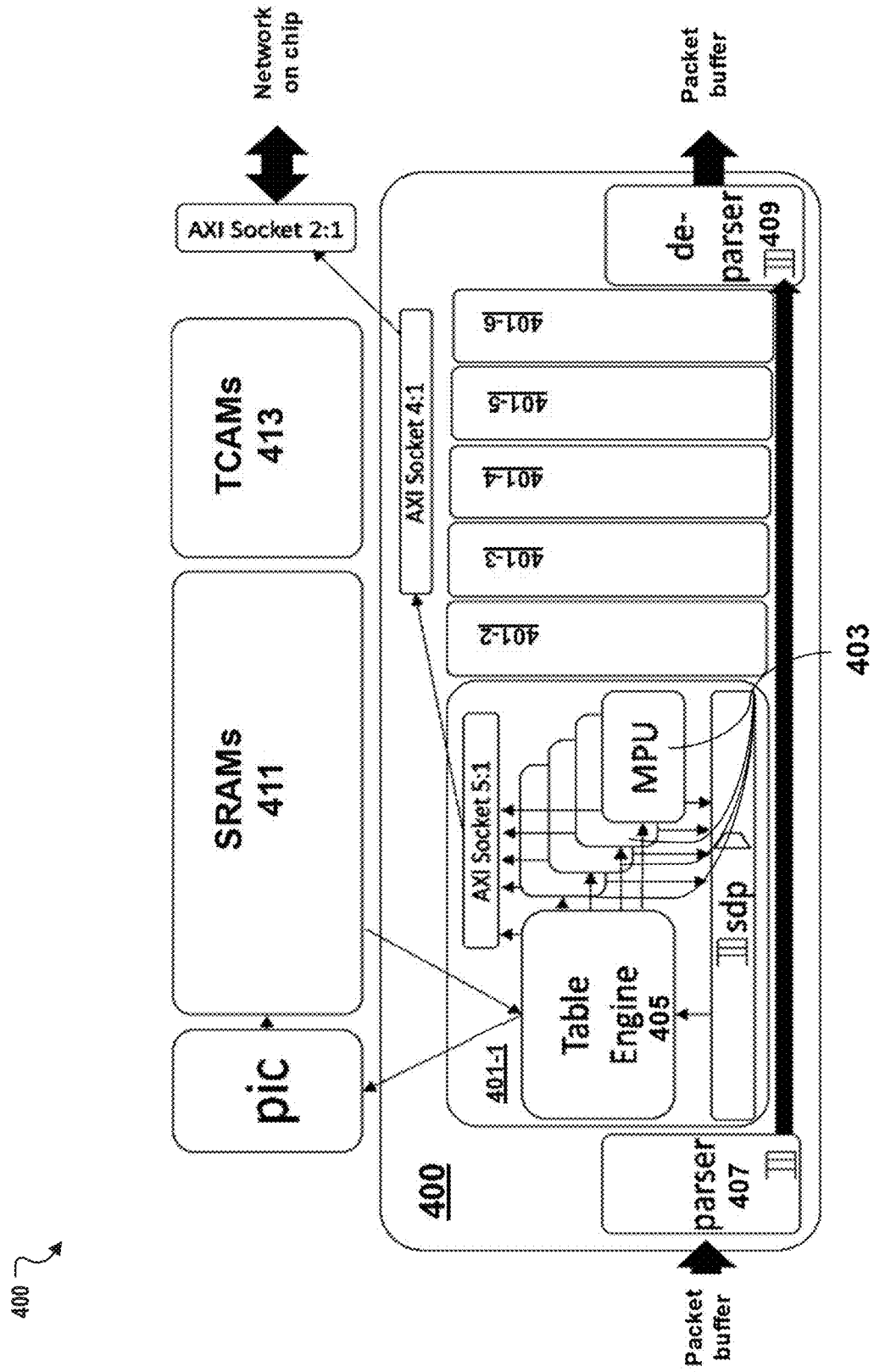
FIG. 4 depicts a non-limiting example of P4 ingress or egress pipeline (PIP pipeline) that may be employed by embodiments of the present disclosure.

In one aspect, a flexible, high performance match action pipeline which can execute a wide range of P4 programs is provided. The P4 pipeline can be programmed to provide various features, including, but not limited to, routing, bridging, tunneling, forwarding, network ACLs, L4 firewalls, flow based rate limiting, VLAN tag policies, membership, isolation, multicast and group control, label push/pop operations, L4 load balancing, L4 flow tables for analytics and flow specific processing, DDOS attack detection, mitigation, telemetry data gathering on any packet field or flow state and various others. FIG. 4 shows a block diagram of an exemplary P4 ingress or egress pipeline (PIP pipeline) 400 in accordance with embodiments of the described system.

In some embodiments, the described system may support a match+action pipeline. The programmer or compiler may decompose the packet processing program into a set of dependent or independent table lookup and action processing stages (i.e., match+action) which are mapped onto the table engine and MPU stages respectively. The match+action pipeline may comprise a plurality of stages. For example, a packet entering the pipeline may be first parsed by a parser (e.g., parser 507) according to the packet header stack specified by a P4 program. This parsed representation of the packet may be referred to as parsed header vector. The parsed header vector may then be passed through stages (e.g., stages 401-1, 401-2, 401-3, 401-4, 401-5, 401-6) of ingress match+action pipeline, wherein each stage is configured to match one or more parsed header vector fields to tables, then updates the packet header vector (PHV) and/or table entries according to the actions specified by the P4 program. In some instances, if the required number of stages exceeds the implemented number of stages, a packet may be recirculated for additional processing. In some cases, the packet payload may travel in a separate first-in-first-out (FIFO) queue until it is reassembled with its PHV in the de-parser (e.g., de-parser 409). The de-parser may rewrite the original packet according to the PHV fields which have been modified (e.g., added, removed, or updated). In some cases, the packet processed by the ingress pipeline may be placed in a packet buffer for scheduling and possible replication. In some cases, once the packet is scheduled and leaves the packet buffer, it may be parsed again to create an egress parsed header vector. The egress parsed header vector may be passed through a sequence of stages of match+action pipeline in a similar fashion of the ingress match+action pipeline, after which a final de-parser operation may be executed before the packet is sent to its destination interface or recirculated for additional processing.

In some embodiments, the ingress pipeline and egress pipeline may be implemented using the same physical block or processing unit pipeline. In some embodiments, the PIP pipeline 400 may comprise at least one parser 407 and at least one de-parser 409. The PIP pipeline 400 may comprise multiple parsers and/or multiple de-parsers. The parser and/or de-parser may be a P4 compliant programmable parser or de-parser. In some cases, the parser may be configured to extract packet header fields according to P4 header definitions and place them in the packet header vector (PHV). The parser may select from any fields within the packet and align the information from the selected fields to create a packet header vector. In some cases, after passing through a pipeline of match+action stages, the de-parser block may be configured to rewrite the original packet according to the updated PHV.

The packet header vector (PHV) produced by the parser may have any size or length. For example, the PHV may be a least 512 bits, 256 bits, 128 bits, 64 bits, 32 bits, 8 bits or 4 bits. In some cases, when a long PHV (e.g., 6 Kb) is desired to contain all relevant header fields and metadata, a single PHV may be time division multiplexed (TDM) across several cycles. This TDM capability provides benefit allowing the described system to support variable length PHVs, including very long PHVs to enable complex features. A PHV length may vary as the packet passes through the match+action stages.

The PIP pipeline may comprise a plurality of match+action stages. After the parser 407 produces the PHV, the PHV may be passed through the ingress match+action stages. In some embodiments, the PIP pipeline may be implemented using multiple stage units 401-1, 401-2, 401-3, 401-4, 401-5, 401-6, each of which may comprise a table engine 405 and multiple MPUs 403. The MPU 403 can be same as the MPU as described in FIG. 4. In the illustrated example, four MPUs are used in one stage unit. However, any other number of MPUs, such as at least one, two, three, four, five, six, seven, eight, nine, or ten can be utilized or grouped with a table engine.

A table engine 405 may be configured to support per-stage table match. For example, the table engine 405 may be configured to hash, lookup, and/or compare keys to table entries. The table engine 405 may be configured to control table match process by controlling the address and size of the table, PHV fields to use as a lookup key, and MPU instruction vector which defines the P4 program associated with the table. A table result produced by the table engine may be distributed to the multiple MPUs 403.

The table engine 405 may be configured to control a table selection. In some cases, upon entering a stage, the PHV may be examined to select which table(s) to enable for the arriving PHV. Table selection criteria may be determined based on the information contained in the PHV. In some cases, a match table may be selected based on packet type information related to a packet type associated with the PHV. For instance, the table selection criteria may be based on packet type or protocols (e.g., Internet Protocol version 4 (IPv4), Internet Protocol version 6 (IPv6) and Multiprotocol Label Switching (MPLS)) or the next table ID as determined by the preceding stage. In some cases, the incoming PHV may be analyzed by the table selection logic, which then generates a table selection key and compares the result using a TCAM to select the active tables. The table selection Key may be used to drive table hash generation, table data comparison, and associated data into the MPUs.

In some embodiments, the table engine 405 may comprise a hash generation unit. The hash generation unit may be configured to generate a hash result off a PHV input and the hash result may be used to conduct a DMA read from a DRAM or SRAM array. In an example, the input to the hash generation unit may be masked according to which bits in the table selection key contribute to the hash entropy. In some cases, the same mask may be used by the table engine for comparison with the returning SRAM read data. In some instances, the hash result may be scaled according to the table size, then the table base offset may be added to create the memory index. The memory index may be sent to the DRAM or SRAM array and to perform the read.

In some cases, the table engine 405 may comprise a TCAM control unit. The TCAM control unit may be configured to allocate memory to store multiple TCAM search tables. In an example, a PHV table selection key may be directed to a TCAM search stage before a SRAM lookup. TCAM search tables can be configured to be up to 1024 bits wide and as deep as TCAM resources permit. In some cases, multiple TCAM tables may be carved from the shared quadrant TCAM resources. The TCAM control unit may be configured to allocate TCAMs to individual stages so that to prevent TCAM resource conflicts or allocate TCAM into multiple search tables within a stage. The TCAM search index results may be forwarded to the table engine for SRAM lookups.

The PIP pipeline 400 may comprise multiple stage units 401-1, 401-2, 401-3, 401-4, 401-5, 401-6. The PIP pipeline may comprise any number of stage units such as at least two, three, four, five, six, seven, eight, nine, ten sage units that can be used within the PIP pipeline. In the illustrated example, six match+action stages units 401-1, 401-2, 401-3, 401-4, 401-5, 401-6 are grouped into a set. The set of stages units may share a common set of SRAMs 411 and TCAMs 413. The SRAMs 411 and TCAMs 413 may be component of the PIP pipeline. This arrangement may allow the six stage units to divide match table resources in any suitable proportion which provides convenience to the compiler and easing the complier's task of resource mapping. Any suitable number of SRAM resources and any suitable number of TCAM resources may be used by each PIP pipeline. For example, the illustrated PIP pipeline may be coupled to ten SRAM resources and four or eight TCAM resources. In some instances, TCAMs may be fused vertically or horizontally for a wider or deeper search.

Extended P4 Pipelines

In one aspect, the described system may support an extended P4 programmable pipeline to allow for direct interfacing with the host driver. The extended P4 programmable pipeline implements the IO device interface as described above. For example, the P4 programmed DMA interfaces may be directly coupled to the host virtual functions (VFs) as well as ARM, CPU, or offload engine interfaces. The extended P4 pipeline may handle required DMA operations and loops. The extended P4 pipeline may include features, including but not limited to, stateless NIC offloads such as TCP segmentation offload (TSO) and Receive Side Scaling (RSS); storage exchange table-style transaction servicing in the extended P4 pipeline; fine grained load balancing decisions that can be extended to individual data structures of performance critical applications, such as Data Plane Development Kit (DPDK) or key value matching; TCP flow termination and initiation for proxy services; RDMA over converged Ethernet (RoCE) and similar remote direct memory access (RDMA) protocol support; custom descriptor and SGL formats can be specified in P4 to match data structures of performance critical applications; new device and VF behaviors can be modelled using P4 programs coupled with host driver development, and various other features.

Data may be transmitted between the packetized domain in the P4 pipeline to/from the memory transaction domain in the host and NIC memory systems. This packet to memory transaction conversion may be performed by the extended P4 pipelines that include DMA write (TxDMA) and/or DMA read (RxDMA) operations. The extended P4 pipeline includes TxDMA may also be referred to as Tx P4 or TxDMA and the extended P4 pipeline includes RxDMA may also be referred to as Rx P4 throughout this specification. The extended P4 pipelines may comprise the same match+action stages in the P4 pipeline, and a payload DMA stage at the end of the pipeline. Packets may be segmented or reassembled into data buffers or memory regions (e.g., RDMA registered memory) according to the extended P4 programs. The payload DMA stage may be a P4 extension which enables the programmable P4 network pipeline extended to the host memory system and driver interface. This P4 extension allows custom data structures and applications interactions to be tailored to application or container needs.

The match table utilized in the extended P4 pipeline may be programmable tables. A stage of an extended P4 pipeline may include multiple programmable tables which may exist in SRAM, NIC DRAM, or host memory. For example, host memory structures may include descriptor rings, SGLs, and control data structures which can be read into the register file unit of the MPU for calculations. The MPU may add PHV commands to control DMA operations to and from host and NIC memory and insert DMA commands into the PHV for execution by the payload DMA stage. The extended P4 programs may include, for example, completion queue events, interrupts, timer set, and control register writes and various other programs.

Example Architecture

Figure 5A:
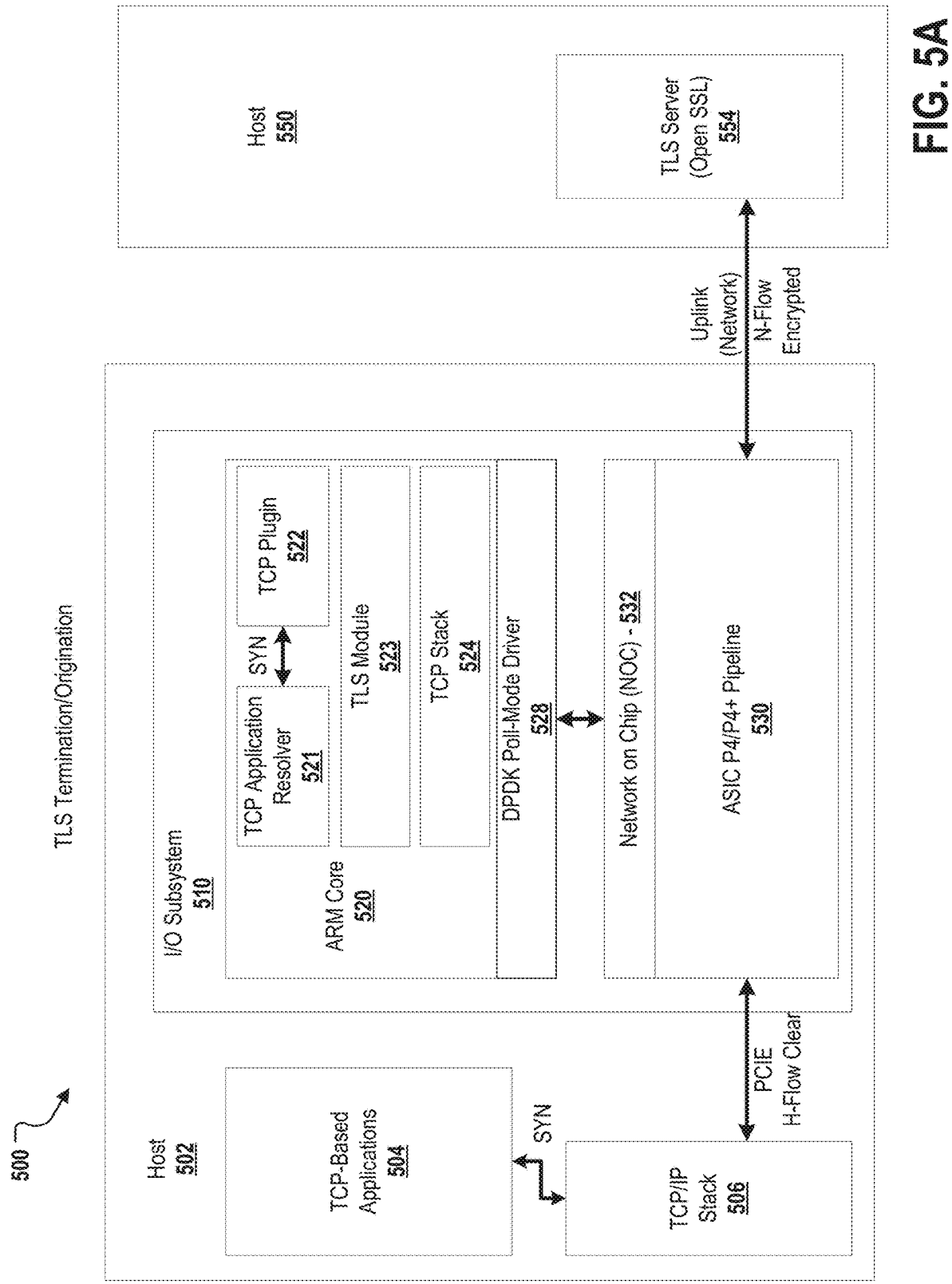
FIGS. 5A and 5B depict an example architecture that can be employed to implement embodiments of the present disclosure.
Figure 5B:
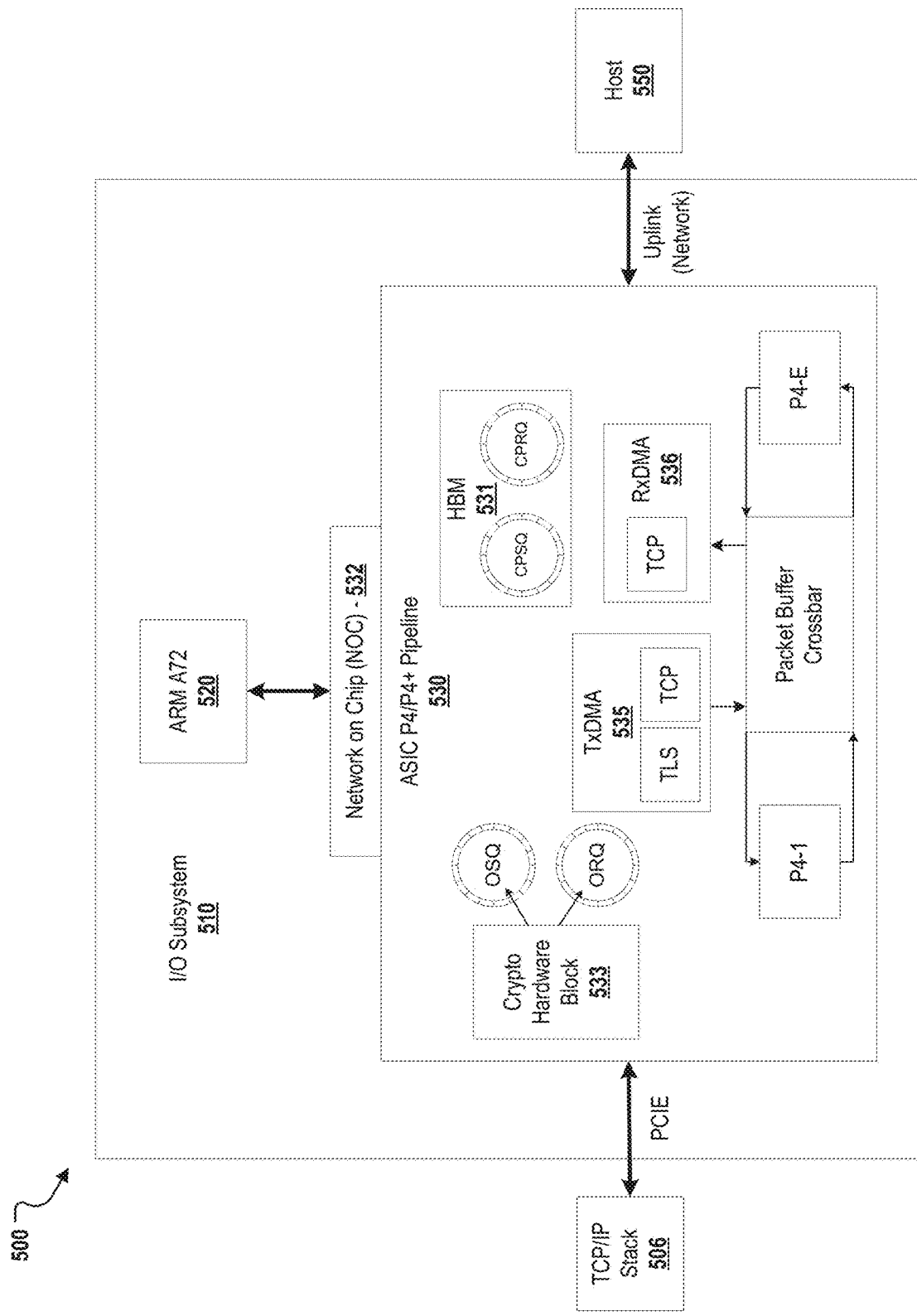
Figure 6A:
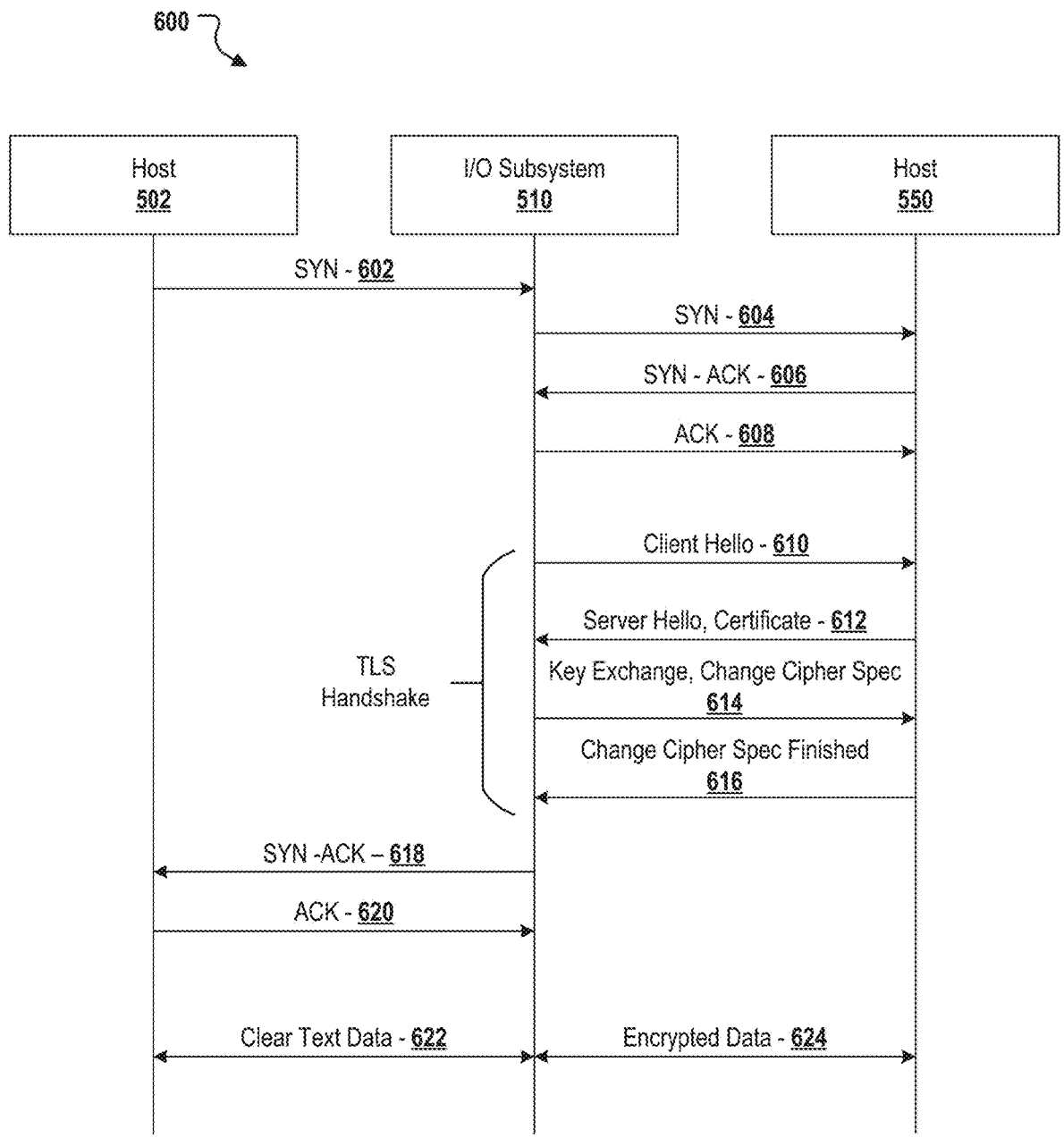
FIGS. 6A and 6B depict flowcharts of non-limiting example processes that can be implemented by embodiments of the present disclosure.
Figure 6B:
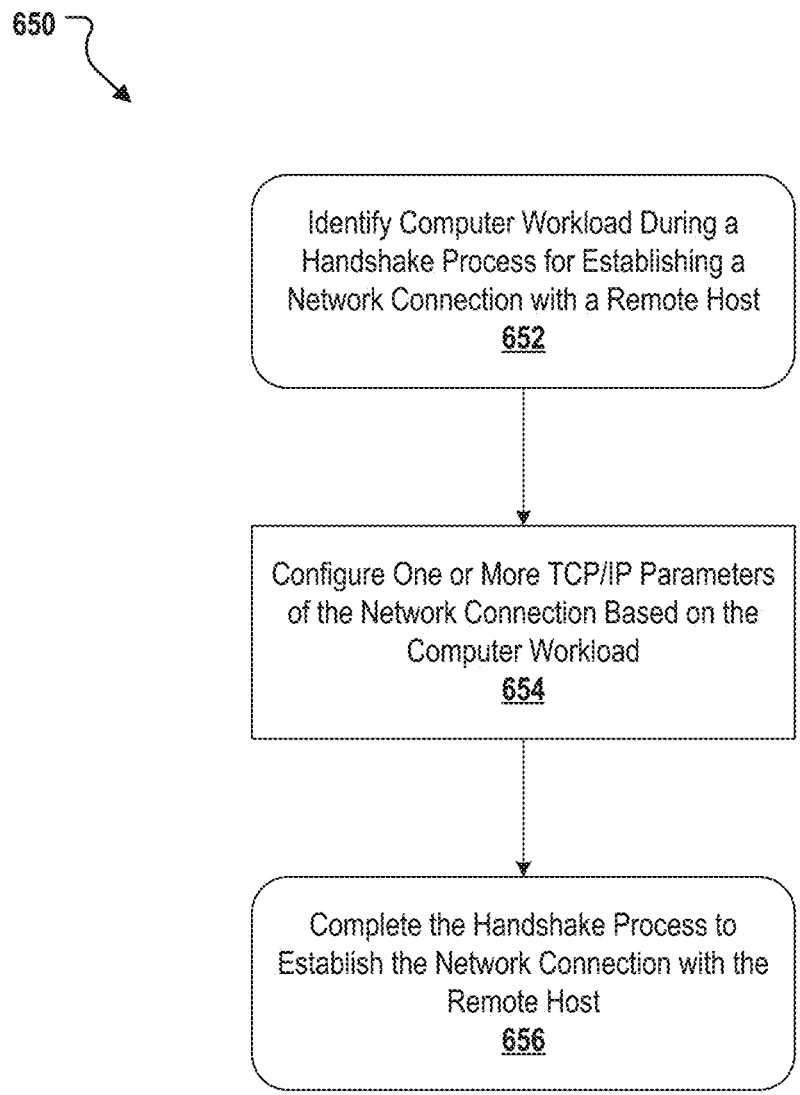

FIGS. 5A and 5B depict an example architecture 500 that can be employed to implement the described transparent proxy via an IO subsystem (e.g., an ISA/SmartNIC) (see FIGS. 6A and 6B). The example architecture 500 includes two hosts 502 and 550. The two hosts are depicted in FIGS. 5A and 5B for simplicity. It is contemplated, however, that implementations of the present disclosure can be realized with any number of hosts devices. Moreover, implementations of the present disclosure can employ any number of devices as required.

As depicted, the host 502 (e.g., a gateway or application/web server) generates a TCP/IP Stack 506 for TCP-Based applications 504 (e.g., an application that communications via the Internet) executed on the host. The information for the TCP/IP Stack 506 is provided to the IO subsystem 510 via PCIE. In some embodiments, the TCP/IP Stack information (e.g., the Host-flow (H-Flow) or the TCP session data) is provided in a clear/unencrypted format to the IO subsystem 510.

In general, the IO subsystem 510 is employed by the described system to offload TLS functionality from, for example, the CPU (now shown) of the host 502. The IO subsystem 510 may employ the ARM core 520 for the TLS handshake and the pipeline 530 may be employed for TCP and TLS state maintenance and handle data packets. In some embodiments, the ARM core 520 handles the management, control plane, and slow datapath functionalities of the described system by employing the P4 subsystem 530, which is a programmable block that supports packet processing including parsing, rewriting, checksum and cyclic redundancy check (CRC) validation, table lookups and forwarding. In some embodiments, the extended P4 subsystem 530 deals with more stateful packet processing including termination of TCP, TLS record processing, data transfer to/from over PCIE, sequencing of hardware offloaded operations such as encryption/decryption, compression/decompression, and so forth.

As depicted, the IO subsystem 510 includes an ARM core 520, an ASIC P4/extended P4 pipeline (P4 subsystem) 530, a packet IO driver 528 and a NOC 532. In some embodiments, the packet IO driver 528 provides an interface that enables transmission of packets to the ARM cores from the uplinks. In some embodiments, packet IO driver 528 is a DPDK Poll-Mode Driver. In some embodiments, the NOC 532 provides the coherent interconnect across all the above blocks.

As depicted, a TCP application resolver module 521, a TCP plugin 522, a TLS module 523, and a TCP stack module 524 are executed by the ARM cores 520. In some embodiments, the TCP application resolver module 521 identifies the type of workload based on the flow match and TCP fingerprinting. Subsequently, when hosts start communicating, the TCP application resolver 521 can also rely on deep packet inspection to determine the workload.

In some embodiments, the TCP plugin 522 provides an interface between the TCP application resolver 521 as well as the slow-path TCP stack running on ARM and the fast-path TCP stack running on the extended P4 pipeline.

In some embodiments, TLS module 523 implements the TLS protocol (e.g., the TLS handshake) with the host 550. In some embodiments, TCP Stack module 524 processes a variant of a TCP stack that is used in the solution on ARM cores in the slow datapath. In some embodiments, the TCP stack module 524 is implemented through a Plugin Vector Packet Processor (VPP).

In some embodiments, the IO subsystem 510 includes cryptographic offloads (see FIG. 5B). In some embodiments, the security functionality is offloaded to the hardware crypto offload to achieve line rate security performance.

In some embodiments, by employing the IO subsystem 510 to provide for a TCP-TLS proxy in, for example, server devices within a network, security operations can be shifted into a single pane (e.g., a single window into the management plane) via a central controller (not shown). Such an architecture enables, for example, consistent/uniform policies and software upgrades related to, for example, key management and key rotation/rekeying to be deployed across the network via the centralized controller.

In some embodiments, the central controller is hosted on a server that may or may not host the IO subsystem 510. In some embodiments, the controller requires network reachability to all the IO subsystems (e.g., ISAs) being administered in the network. For example, a network administrator may employ a graphical interface or representational state transfer (REST)/gRPC Remote Procedure Call (gRPC) application programming interfaces (APIs) for the controller to provision the IO subsystems, and configure policies for the workloads. In some embodiments, the controller is the only point of management of all ISAs in this scenario and software upgrades are carried out via the controller.

In some embodiments, the controller can apply policies to individual hosts allowing for specific exceptions to the uniform policies for the network provided on a per host basis. In some embodiments, the controller supports transparent software upgrades on a network by transparently providing updates (e.g., a security update) to servers in a network without having, for example, the server administrators individually update each server. Example security operations that can be shifted into a single pane via the central controller include: enforcing minimum security requirement to be TLS version 1.3 across all workloads in the network, increasing the key sizes used to guarantee security when smaller keys are deemed insufficient for required security strengths, and so forth.

FIG. 5B depicts an example of the ASIC P4/extended P4 pipeline 530 in more detail. As depicted in FIG. 5B, the ASIC P4/extended P4 pipeline 530 includes HBM 531, a crypto hardware block 533, a TxDMA module 535, an RxDMA module 536. As depicted, the HBM 531 employs control plane send queues and control plane receive queues.

As depicted, the crypto hardware block 533 employs an offload send queue and an offload receive queue. In some embodiments, the crypto hardware block 533 includes a hardware cryptographic offload and is used for encryption and decryption between the hosts (e.g., the perform a crypto algorithm for TLS or open SSL). In some embodiments, the crypto hardware block 533 is the actual cipher implementation for encryption and authentication provided through/by the host.

As described above in the description of FIG. 4, data may be transmitted between the packetized domain in the P4 pipeline to/from the memory transaction domain in the host 550 and NIC memory systems. This packet to memory transaction conversion may be performed by the extended P4 pipelines that include the TxDMA module 535 and the RxDMA module 536 performing the respective operations.

As depicted, once the ARM cores 520 have completed the handshakes for TLS and TCP, handling of the data plane (e.g., record processing for TCP and TLS) is implemented in P4 subsystem 530 via the TxDMA module 535 and the RxDMA module 536. In some embodiments, crypto offloads are employed for symmetric encryption and decryption (e.g., storage of the established symmetric keys). In some embodiments, the asymmetric cryptography is offloaded into hardware offload engines to quickly achieve the heavy weight encryption and decryption of using asymmetric cryptography.

Example Processes

FIGS. 6A and 6B each depict a flowchart of an example process 600 and 650 respectively. The example processes 600 and 650 can be implemented by the various elements of the described transparent proxy system. As depicted, the example processes show in more detail how a TCP-Transport Layer Security (TLS) Proxy is provided via an IO subsystem. In some embodiments, the programmable IO device is a distributed service card. Process 600 is implemented by employing an architecture, such as depicted in FIGS. 5A and 5B. Generally, the process 600 indicates the TCP Proxy behavior in an IO system employed by the described transparent proxy system where the application's TCP SYN packets are captured at the IO subsystem and can be subjected to the policy evaluation to determine the application identity. Generally, process 650 actuates TCP/IP through a programmable IO device For clarity of presentation, the description that follows generally describes the example processes 600 and 650 in the context of FIGS. 1-5B, 7, and 8. However, it will be understood that the processes 600 and 650 may be performed, for example, by any other suitable system, environment, software, and hardware, or a combination of systems, environments, software, and hardware as appropriate. In some embodiments, various operations of the processes 600 and 650 can be run in parallel, in combination, in loops, or in any order.

For process 600 depicted in FIG. 6A, at 602, a synchronization (SYN) packet is generated by the host 502 and provided to the IO subsystem 510. For example, the SYN packet may be generated for a TCP-Based Application 504 destined for the host 550. In some embodiments, once the SYN packet is received, the IO subsystem 510 provides the received SYN packet to an ARM Core 520 via a CPU flow-miss program. In some embodiments, CPU flow-miss program includes a P4 and extended P4 program that supports relaying certain specific packets for processing on ARM in the slow data-path as deemed by the P4 program. In some embodiments, the TCP plugin 522, executed within the ARM Core 520, process the SYN packet through commination with the TCP application resolver 521. In some embodiments, the TCP application resolver 521 processes the TCP flow and determines TCP parameters for functionality and performance to be applied to the connection. In some embodiments, once the parameters are determined, the SYN packet is processed by the TCP stack module 524 to generate a new SYN packet toward the destination host, host 550, for network Flow (n-Flow). In some embodiments, the original SYN packet is held by the IO device 520 and responded to (at 618) after the TCP and TLS handshake is established with Host 550. From 602, the process proceeds to 604.

At 604, the new SYN packet (generated by the IO subsystem) is provided to the destination host 550. From 604, the process proceeds to 606.

At 606, a synchronization-acknowledged (SYN-ACK) packet sent from the destination host 550 is received by the IO device 510. In some embodiments, the received SYN-ACK packet is processed (e.g., for packet to memory transaction conversion) by the an RxDMA program executed through the ASIC P4/enhanced P4 pipeline 530. From 606, the process proceeds to 608.

At 608, an acknowledged (ACK) packet is generated by the IO subsystem 510 and provided to the destination host 550. The results from the RxDMA program are forwarded to ARM core 620 where the TCP stack module 524 marks the connection as established and prompt the TLS module 523 to initiate an SSL handshake between the IO Subsystem 510 and the destination host 550. From 608, the process proceeds to 610. In some embodiments, the TCP stack module 524 is a slow data-path TCP stack on ARM that marks this.

At 610, the TLS module 523 generated a Client Hello packet and provides the Client Hello packet to the destination host 550. In some embodiments, the Client Hello packet is forwarded by the ASIC P4/enhanced P4 pipeline 530. From 610, the process proceeds to 612.

At 612, a Server Hello packet and the certificate information sent from the host 550 is received by the IO subsystem 510. The Server Hello packet is processed by the RxDMA module 536 and forwarded to the TxDMA module 535 (TLS), which includes the interface between the TCP P4 program and the TLS P4 program. In some embodiments, the packet is forwarded to the ARM core 520 where it is processed via the TLS module 523. From 612, the process proceeds to 614.

At 614, a ChangeCipherSpec message and key information are provided to the host 550 the TLS module 523 via the ASIC P4/enhanced P4 pipeline 530. From 614, the process proceeds to 616.

At 616, the ChangeCipherSpec finished response message provide by the host 550 is received, which completes the SSL handshake (e.g., signals begin of session with the exchanged keys are used). The response message is processed by the ASIC P4/enhanced P4 pipeline 530. In some embodiments, the response is forwarded to the ARM core 520 and processed via the TLS module 523. In some embodiments, the exchanges TLS programs keys are stored to memory for quick access. From 616, the process proceeds to 618.

AT 618, SYN-ACK packet information is provide to the host 502 (e.g., to the CPU) by the TLS module 523 via the ASIC P4/enhanced P4 pipeline 530. From 618, the process proceeds to 620.

At 620, the ACK is received from the HOST 520 to complete the handshake between the Host 520 and the IO subsystem 51. From 620, the process proceeds to 622.

At 622, communication between the host 502 and the ASIC P4/enhanced P4 pipeline 530 is conducted unencrypted via the PCIE connection. At 624, communication between the ASIC P4/enhanced P4 pipeline 530 and the host 550 is encrypted. In some embodiments, the data received for the host 550 by the ASIC P4/enhanced P4 pipeline 530 is processed by RxDMA module 536, which then provides the processed data to the TxDMA module 535 for pre-decryption. In some embodiments, the pre-decrypted data is provided to the crypto hardware block 534 for decryption. In some embodiments, post decryption data is provided to the to the TCP TxDMA 535, which forwards it to the host 502. From 622, the process 600 ends.

For process 650 depicted in FIG. 6B, at 652, a computer workload is identified during a handshake process for establishing a network connection with a remote host. In some embodiments, the computer workload is a software application, a container application, or a computing process, provided through the host device. From 652, the process 650 proceeds to 654.

At 654, one or more TCP/IP parameters of the network connection are configured based on the computer workload. In some embodiments, a cryptographic identity of the computer workload is identified. In some embodiments, the cryptographic identity of the computer workload is related to an associated security group. In some embodiments, the one or more TCP/IP parameters are configured based on the cryptographic identity of the computer workload. In some embodiments, the handshake process comprises sending a certificate including the cryptographic identity of the computer workload. In some embodiments, a deep packet inspection is performed on a data packet received by the programmable IO device. In some embodiments, the cryptographic identity of the computer workload is identified based on the deep packet inspection. In some embodiments, the one or more TCP/IP parameters are configured based a network policy associated with the cryptographic identity of the computer workload. In some embodiments, the network policy comprises a type of the computer workload, a priority of the computer workload, or a port associated with the computer workload, an IP address associated with the computer workload, or a protocol associated with the computer workload. In some embodiments, a plurality of computer workloads and a cryptographic identity of each of the computer workloads, are identified during the handshake process. In some embodiments, the one or more TCP/IP parameters are configured based on the cryptographic identities of the computer workloads. In some embodiments, the one or more TCP/IP parameters are configured based on a queue depth of a queue associated with the computer workload, and wherein the queue depth is determined according to a difference between the queue and a consumer index. In some embodiments, the queue depth is determined using a difference between a producer index and a consumer index of the queue. In some embodiments, the consumer index is a pointer owned by the consumer of a shared ring at which the next resource can be consumed if available. In some embodiments, the producer ring is a pointer to the entry at which the producer can produce if the ring has space. In some embodiments, the one or more TCP/IP parameters are associated with a congestion control algorithm, a retransmission method, a sequence number, a TCP flag checking method, a transmission-window size, a congestion window assize, or a send/receive buffer size. In some embodiments, the one or more TCP/IP parameters are related to L4-L7 protocols. From 654, the process 650 proceeds to 656.

AT 656, the handshake process is completed to establish the network connection with the remote host. In some embodiments, a security protocol to be applied to a data flow associated with the computer workload is enabled or disabled. In some embodiments, the security protocol is enabled or disabled based on a request or a location of the computer workload. In some embodiments, a data flow is terminated, and one or more TCP algorithms are determined based on the data flow. In some embodiments, a TCP algorithm is upgraded without intervention from the host device. From 656, the process 65 ends.

Computer Systems

Figure 7:
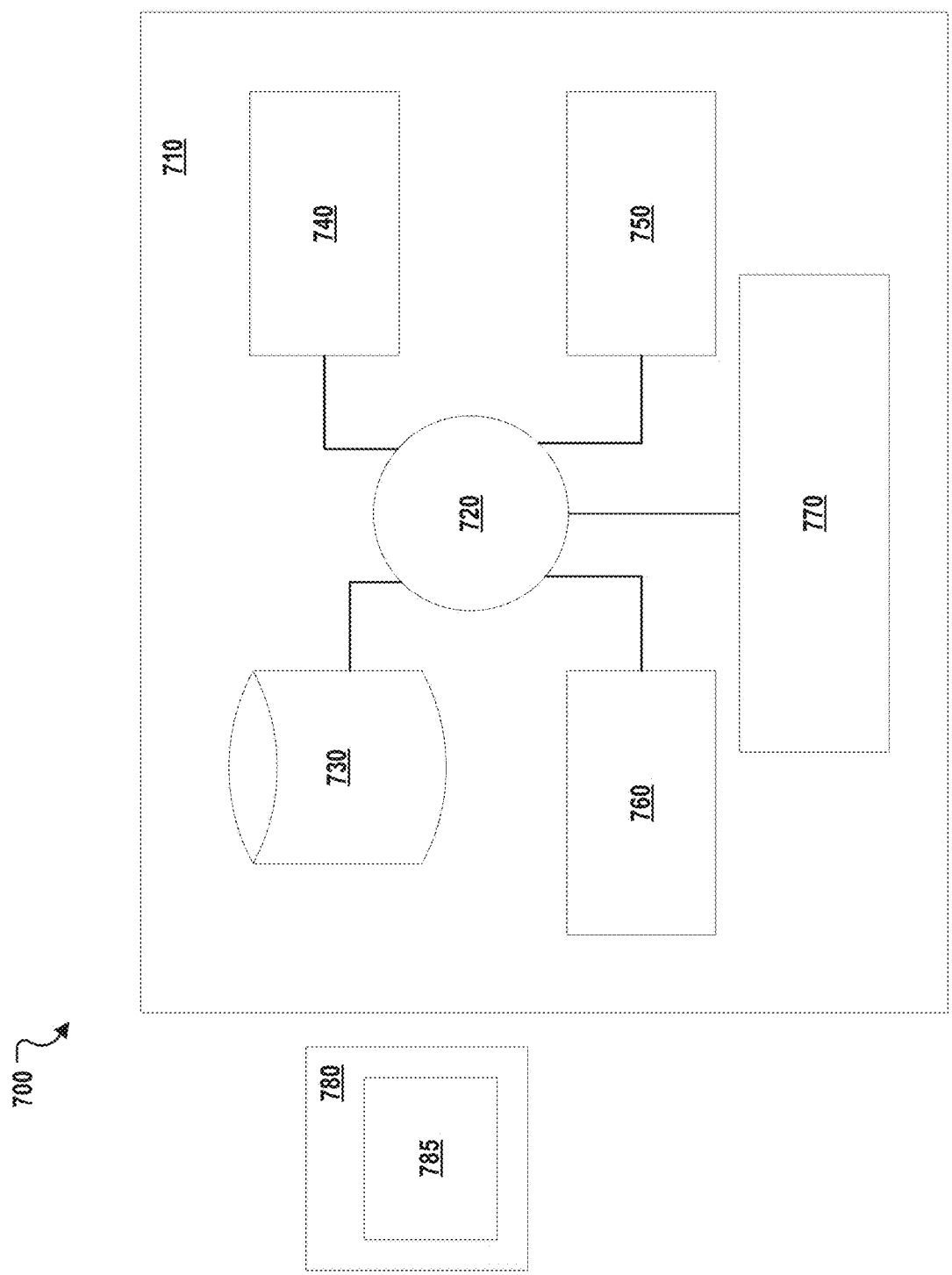
FIG. 7 depicts a non-limiting example computer system that can be programmed or otherwise configured to implement methods or systems of the present disclosure.

Computer systems are provided herein that can be used to implement methods or systems of the disclosure. FIG. 7 depicts an example a computer system 700 that can be programmed or otherwise configured to implement methods or systems of the present disclosure. For example, the computing device 710 can be programmed or otherwise configured to employ the IO subsystem 770 to provide a wire-speed TCP/IP proxy service that is transparent to host applications. As depicted, the computer system 700 includes a computing device 710 and an optional electronic display 780. In some embodiments, the computing device 710 is substantially similar to the computing system 120 depicted in FIG. 1. In some embodiments, the computing device 710 is substantially similar to the hosts 502 and 550 depicted in FIGS. 5A and 5B.

In the depicted embodiment, the computing device 710 includes a CPU (also "processor" and "computer processor" herein) 720, which is optionally a single core, a multi core processor, or a plurality of processors for parallel processing. The computing device 710 also includes memory or memory location 730 (e.g., random-access memory, read-only memory, flash memory); electronic storage unit 740 (e.g., hard disk); communication interface 750 (e.g., network adapter) for communicating with one or more other systems; peripheral devices 760 (e.g., cache, other memory, data storage or electronic display adapters), and IO subsystem 770 (e.g., an IO device, such as a smartNIC or ISA). The memory 730, the electronic storage unit 740, the communication interface 750, the peripheral devices 760, and the IO subsystem 770 are in communication with the CPU 720 through a communication bus (solid lines), such as a motherboard.

In some embodiments, the CPU 720 can execute a sequence of machine-readable instructions, which can be embodied in a program or software. The instructions may be stored in a memory location, such as the memory 730. The instructions can be directed to the CPU 720, which can subsequently program or otherwise configure the CPU 720 to implement methods of the present disclosure. Examples of operations performed by the CPU 720 can include fetch, decode, execute, and write back. In some embodiments, the CPU 720 is part of a circuit, such as an integrated circuit. One or more other components of the computing device 710 can be optionally included in the circuit. In some embodiments, the circuit is an ASIC or a Field Programmable Gate Array (FPGA).

In some embodiments, the IO subsystem 770 (e.g., the above described IO device) comprises an expansion card, such as a smartNIC, that is connected with the CPU 720 via PCIe. In some embodiments, the IO subsystem 770 is completely programmable ASIC engine. In some embodiments, an ASIC engine is tailored to a specific subset of functions, such as compression and checksum, while another engine is dedicated for symmetric cryptography.

In some embodiments, the electronic storage unit 740 includes a data storage unit (or data repository) for storing data. In some embodiments, the electronic storage unit 740 stores files, such as drivers, libraries, images, and saved programs. In some embodiments, the electronic storage unit 740 stores user data, e.g., user preferences and user programs. In some embodiments, the computing device 710 includes one or more additional data storage units that are external, such as located on a remote server that is in communication through an intranet or the internet.

Figure 8:
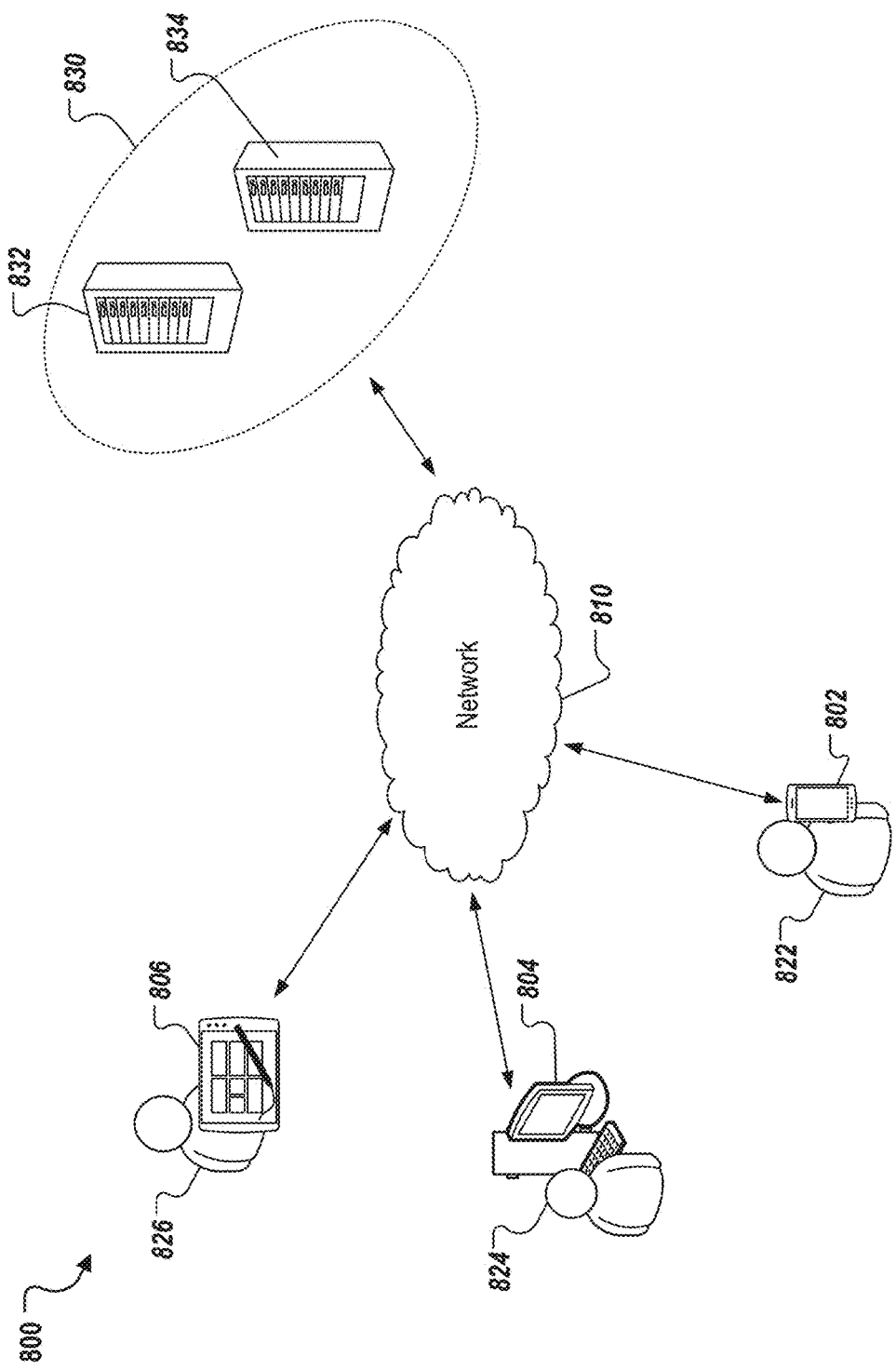
FIG. 8 depicts a non-limiting example environment where implementations of the present disclosure can be employed.

The computing device 710 is optionally operatively coupled to a network, such as the network 810 depicted and described in FIG. 8, with the aid of the communication interface 750. In some embodiments, the computing device 710 communicates with one or more remote computer systems through the network. Examples of remote computer systems include personal computers (e.g., portable PC), slate or tablet PCs (e.g., Apple® iPad, Samsung® Galaxy Tab, etc.), smartphones (e.g., Apple® iPhone, Android-enabled device, Blackberry®, etc.), or personal digital assistants. In some embodiments, a user can access the computing device 710 via a network.

In some embodiments, methods as described herein are implemented by way of machine (e.g., computer processor) executable code stored on an electronic storage location of the computing device 710, such as, for example, on the memory 730 or the electronic storage unit 740. In some embodiments, the CPU 720 is adapted to execute the code. In some embodiments, the machine executable or machine-readable code is provided in the form of software. In some embodiments, during use, the code is executed by the CPU 720. In some embodiments, the code is retrieved from the electronic storage unit 740 and stored on the memory 730 for ready access by the CPU 720. In some situations, the electronic storage unit 740 is precluded, and machine-executable instructions are stored on the memory 740. In some embodiments, the code is pre-compiled. In some embodiments, the code is compiled during runtime. The code can be supplied in a programming language that can be selected to enable the code to execute in a pre-compiled or as-compiled fashion.

In some embodiments, the computing device 710 can include or be in communication with the electronic display 780. In some embodiments, the electronic display 780 provides a user interface (UI) 785.

Example Environment

FIG. 8 depicts an example environment 800 that can be employed to execute implementations of the present disclosure. The example system 800 includes computing devices 802, 804, and 806; a back-end system 830; and a network 810.

In some embodiments, the network 810 includes a local area network (LAN), wide area network (WAN), the Internet, or a combination thereof, and connects web sites, devices (e.g., the computing devices 802, 804, and 806) and back-end systems (e.g., the back-end system 830). In some embodiments, the network 810 includes the Internet, an internet, and/or extranet, or an intranet and/or extranet that is in communication with the Internet. In some embodiments, the network 810 includes a telecommunication and/or data network. In some embodiments, the network 810 can be accessed over a wired and/or a wireless communications link. For example, mobile computing devices (e.g., the smartphone device 802 and the tablet device 806), can use a cellular network to access the network 810.

In the depicted example environment 800, the back-end system 830 includes server devices 832 and 834, which can be employed to provide the described transparent proxy system. In some embodiments, the back-end system 830 may be deploy within a data center that provides services, such as a web service, the computing devices 802, 804, and 806. The described transparent proxy system may be employed within the example environment 800 through an IO subsystem to provide for a transparent proxy to actuate TCP/IP.

In some embodiments, back-end system 830 includes computer systems using clustered computers and components to act as a single pool of seamless resources when accessed through the network 810. For example, such implementations may be used in data center, cloud computing, storage area network (SAN), and network attached storage (NAS) applications. In some embodiments, the servers 832 and 834 hosts one or more computer-implemented services with which users 822, 824, and 826 can interact using the respective computing devices 802, 804, and 806.

In some embodiments, the server devices 832 and 834 are each sustainably similar to the computing device 710 depicted in FIG. 7 as well as the hosts 502 and 550 depicted in FIGS. 5A and 5B depending on how the server devices 832 and 834 are being used within the described system (e.g., which server device includes an ISA employed to a wire-speed proxy service that is transparent to host applications). In some embodiments, the server devices 832 and 834 are server-class hardware type devices.

In some examples, the users 822, 824, and 826 interact with the services provided by the back-end system 830 through a graphical user interface (GUI) or application that is installed and executing on their respective computing devices 802, 804, and 806. In some examples, the computing devices 802, 804, and 806 provide viewing data to screens with which the users 822, 824, and 826 can interact. In some embodiments, the computing devices 802, 804, 806, and 832 are sustainably similar to computing device 710 depicted in FIG. 7. The computing devices 802, 804, 806 may each include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In the depicted example, the computing device 802 is a smartphone, the computing device 804 is a tablet-computing device, and the computing device 806 is a desktop computing device. Three user computing devices 802, 804, and 806, are depicted in FIG. 8 for simplicity. It is contemplated, however, that implementations of the present disclosure can be realized with any of the appropriate computing devices, such as those mentioned previously. Moreover, implementations of the present disclosure can employ any number of devices as required.

Processing Devices and Processors

In some embodiments, the platforms, systems, media, and methods described herein include a computer, or use of the same. In further embodiments, the computer includes one or more hardware CPUs or general-purpose graphics processing units (GPGPUs) that carry out the device's functions by providing chains of operation to an IO subsystem provided through a SmartNIC connected to the CPU or GPGPU via PCIe. In still further embodiments, the computer comprises an operating system configured to perform executable instructions. In some embodiments, the computer is optionally connected a computer network. In further embodiments, the computer is optionally connected to the Internet such that it accesses the World Wide Web. In still further embodiments, the computer is optionally connected to a cloud computing infrastructure. In other embodiments, the computer is optionally connected to an intranet. In other embodiments, the computer is optionally connected to a data storage device.

In accordance with the description herein, suitable computers include, by way of non-limiting examples, server computers, desktop computers, laptop computers, notebook computers, sub-notebook computers, netbook computers, netpad computers, handheld computers, Internet appliances, mobile smartphones, tablet computers, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the computer is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, compact disc (CD)-Read only Memories (ROMs), Digital Versatile Disks (DVDs), flash memory devices, magnetic disk drives, magnetic tapes drives, optical disk drives, and cloud computing-based storage. In further embodiments, the storage and/or memory device is a combination of devices such as those disclosed herein.

Non-Transitory Computer Readable Storage Medium

In some embodiments, the platforms, systems, media, and methods disclosed herein include one or more non-transitory computer readable storage media encoded with a program including instructions executable by the operating system of an optionally networked computer. In further embodiments, a computer readable storage medium is a tangible component of a computer. In still further embodiments, a computer readable storage medium is optionally removable from a computer. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. In some embodiments, a computer program includes a sequence of instructions, executable in the computer's CPU or in the processors of an IO subsystem, written to perform a specified task. Computer readable instructions may be implemented as program modules, such as functions, objects, API, data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

While preferred embodiments of the present subject matter have been shown and described herein, it will be obvious to those skilled in the art that such embodiments are provided by way of example only. Numerous variations, changes, and substitutions will now occur to those skilled in the art without departing from the described system. It should be understood that various alternatives to the embodiments of the subject matter described herein may be employed in practicing the described system.

What is claimed is:

1. A programmable input output (IO) device comprising:
   at least one advanced reduced instruction set computer (RISC) machine (ARM) core communicably coupled to at least one central processing unit (CPU) core of a host device; and
   a memory unit, the memory unit having instructions stored thereon which, when executed by the at least one ARM core, cause the programmable IO device to perform operations to actuate transmission control protocol/Internet protocol (TCP/IP), the operations comprising:
      identifying a cryptographic identity of a computer workload during a handshake process for establishing a network connection with a remote host, wherein the cryptographic identity of the computer workload is related to an associated security group;
      dynamically tuning, based at least in part on a network policy associated with the cryptographic identity of the computer workload, one or more TCP/IP parameters of the network connection for adjusting a performance of the network connection for the computer workload; and
      completing the handshake process to establish the network connection with the remote host.

2. The programmable IO device of claim 1, wherein the computer workload is a software application, a container application, or a computing process, provided through the host device.

3. The programmable IO device of claim 1, wherein the handshake process comprises sending a certificate including the cryptographic identity of the computer workload.

4. The programmable IO device of claim 1, wherein the operations comprise:
   preforming a deep packet inspection on a data packet received by the programmable IO device, wherein the cryptographic identity of the computer workload is identified based on the deep packet inspection.

5. The programmable IO device of claim 1, wherein the network policy comprises a type of the computer workload, a priority of the computer workload, or a port associated with the computer workload, an IP address associated with the computer workload, or a protocol associated with the computer workload.

6. The programmable IO device of claim 1, wherein the operations comprise:
   identifying, during the handshake process, a plurality of computer workloads and a cryptographic identity of each of the computer workloads, wherein the one or more TCP/IP parameters are tuned based the cryptographic identities of the computer workloads.

7. The programmable IO device of claim 1, wherein the one or more TCP/IP parameters comprise an advertised window and is tuned based on a queue depth of a queue associated with the computer workload, and wherein the queue depth is determined according to a difference between the queue and a consumer index.

8. The programmable IO device of claim 1, wherein the one or more TCP/IP parameters are associated with a congestion control algorithm, a retransmission method, a sequence number, a TCP flag checking method, a transmission-window size, a congestion window assize, or a send/receive buffer size.

9. The programmable IO device of claim 1, wherein the one or more TCP/IP parameters are related to L4-L7 protocols.

10. The programmable IO device of claim 1, wherein the operations comprise:
    enabling or disabling a security protocol to be applied to a data flow associated with the computer workload.

11. The programmable JO device of claim 10, wherein the security protocol is enabled or disabled based on a request or a location of the computer workload.

12. The programmable IO device of claim 10, wherein the operations comprise:
    terminating the data flow; and
    determining one or more TCP algorithms based on the data flow.

13. The programmable IO device of claim 1, wherein the operations comprise:
    upgrading a TCP algorithm without intervention from the host device.

14. A method for actuating transmission control protocol/Internet protocol (TCP/IP) through a programmable input output (IO) device coupled to a host device, the method comprising:
    identifying a cryptographic identity of a computer workload during a handshake process for establishing a network connection with a remote host, wherein the cryptographic identity of the computer workload is related to an associated security group;
    dynamically tuning, based at least in part on a network policy associated with the cryptographic identity of the computer workload, one or more TCP/IP parameters of the network connection for adjusting a performance of the network connection for the computer workload; and
    completing the handshake process to establish the network connection with the remote host.

15. The method of claim 14, wherein the computer workload is a software application, a container application, or a computing process, provided through the host device.

16. The method of claim 14, comprising:
    preforming a deep packet inspection on a data packet received by the programmable IO device, wherein the cryptographic identity of the computer workload is identified based on the deep packet inspection.

17. A transparent proxy system, comprising:
    a remote host;
    a host device comprising:
    at least one central processing unit (CPU) core; and
    a programmable input output (IO) device comprising:
    at least one advanced reduced instruction set computer (RISC) machine (ARM) core communicably coupled to the at least one CPU core, the programmable input output (IO) device configured to execute instructions that cause the programmable IO device to perform operations actuating transmission control protocol/Internet protocol (TCP/IP), the operations comprising:
    identifying a cryptographic identity of a computer workload during a handshake process for establishing a network connection with the remote host, wherein the cryptographic identity of the computer workload is related to an associated security group;
    dynamically tuning, based at least in part on a network policy associated with the cryptographic identity of the computer workload, one or more TCP/IP parameters of the network connection for adjusting a performance of the network connection for the computer workload; and
    completing the handshake process to establish the network connection with the remote host.

* * * * *

UNITED STATES PATENT AND TRADEMARK OFFICE
CERTIFICATE OF CORRECTION

| | |
|---|---|
| PATENT NO. | : 11,431,681 B2 |
| APPLICATION NO. | : 16/842537 |
| DATED | : August 30, 2022 |
| INVENTOR(S) | : Sameer Kittur et al. |

It is certified that error appears in the above-identified patent and that said Letters Patent is hereby corrected as shown below:

In the Claims

Column 34, Line 65, In Claim 11, delete "JO" and insert -- IO --, therefor.

Signed and Sealed this
Fourteenth Day of February, 2023

*Katherine Kelly Vidal*

Katherine Kelly Vidal
*Director of the United States Patent and Trademark Office*